(12) United States Patent
Momeyer et al.

(10) Patent No.: US 8,432,368 B2
(45) Date of Patent: Apr. 30, 2013

(54) USER INTERFACE METHODS AND SYSTEMS FOR PROVIDING FORCE-SENSITIVE INPUT

(75) Inventors: Brian Momeyer, San Diego, CA (US); Babak Forutanpour, Carlsbad, CA (US); Samuel J. Horodezky, San Diego, CA (US); Ted R. Gooding, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 529 days.

(21) Appl. No.: 12/652,922

(22) Filed: Jan. 6, 2010

(65) Prior Publication Data
US 2011/0167391 A1    Jul. 7, 2011

(51) Int. Cl.
*G06F 3/041* (2006.01)
(52) U.S. Cl.
USPC .............................. 345/173; 345/156; 715/863
(58) Field of Classification Search .......... 345/156–173; 715/863
See application file for complete search history.

(56) References Cited

U.S. PATENT DOCUMENTS

| | | | | |
|---|---|---|---|---|
| 2003/0122779 A1* | 7/2003 | Martin et al. | ................. | 345/156 |
| 2004/0251918 A1 | 12/2004 | Cehelnik | | |
| 2006/0071911 A1* | 4/2006 | Sullivan | ........................ | 345/173 |
| 2007/0002018 A1* | 1/2007 | Mori | ............................. | 345/158 |
| 2007/0143273 A1* | 6/2007 | Knaus et al. | ....................... | 707/3 |
| 2008/0093130 A1 | 4/2008 | Lee et al. | | |
| 2008/0136587 A1 | 6/2008 | Orr | | |
| 2008/0167896 A1* | 7/2008 | Fast et al. | .......................... | 705/1 |
| 2009/0066663 A1* | 3/2009 | Chang et al. | .................. | 345/173 |
| 2009/0184921 A1 | 7/2009 | Scott et al. | | |
| 2009/0231295 A1 | 9/2009 | Petit et al. | | |
| 2009/0312051 A1 | 12/2009 | Hansson et al. | | |
| 2010/0145660 A1* | 6/2010 | Lang et al. | ..................... | 702/193 |

OTHER PUBLICATIONS

International Search Report and Written Opinion—PCT/US2011/020134—ISA/EPO—Nov. 10, 2011.

* cited by examiner

*Primary Examiner* — Amare Mengistu
*Assistant Examiner* — Premal Patel
(74) *Attorney, Agent, or Firm* — James T. Hagler

(57) ABSTRACT

Methods and systems implement touch sensors or force sensitive materials disposed on the case of a computing device in order to enable user input gestures to be performed on portions of the device case. The force sensitive elements may generate an electrical signal in response to a gesture, such as a tap, squeeze, swipe or twist. The properties of the generated electrical signal may be compared to various reference templates to recognize particular input gestures. The force sensitive elements may operate in conjunction with more traditional input methods, such as touch-screen display and electromechanical buttons. By enabling user input gestures on the case of computing devices, the various aspects permit one hand operation of the devices including intuitive gestures that do not require the users focused attention to accomplish. Thus the various aspects may enable users to utilize their computing devices in situations not suitable to conventional user input technologies.

80 Claims, 19 Drawing Sheets

USER INTERFACE METHODS AND SYSTEMS FOR PROVIDING FORCE-SENSITIVE INPUT

FIELD OF THE INVENTION

The present invention relates generally to mobile device user interface systems and more particularly to user interface systems for accepting input on a mobile device.

BACKGROUND

Mobile computing devices utilize a wide variety of input methods. Physical buttons have been supplemented with input devices such as scrolling wheels, trackballs, and touch sensitive devices such as touch pads and touch screen displays. While such improvements to the user interface have improved the utility of many mobile devices, most user interfaces require the user's focused attention to see and item being pressed or a response to the user input on a display screen. This requirement can distract users when they are using their mobile device while performing operations that require their focused attention, such as driving a car. Also, many mobile device user interface configurations require two hands to operate; one hand to hold device so that the fingers of the other hand can interact with the interface, such as touching icons on a touchscreen display. Consequently, many user input technologies preclude use of a mobile device when the user has only one free hand, such as while holding an umbrella.

SUMMARY

The various aspects include a method for capturing user input on a computing device, including receiving an electrical signal from a force sensitive sensor positioned on a case of the computing device, comparing the received electrical signal to a reference signal template, determining whether the received electrical signal matches the reference signal template, identifying a functionality associated with a matched reference signal template, and implementing the identified functionality on the computing device. In a further aspect implementing the identified functionality on the computing device may include generating a user input event notification, and forwarding the user input event notification to an application executing on the computing device. In a further aspect, the force sensitive sensor comprises a piezoelectric sensor. In an aspect, the method may further include filtering the received electrical signal for electromagnetic interference, converting the received electrical signal from analog to digital format, normalizing the received electrical signal in at least one of frequency and amplitude, and identifying a portion of the received electrical signal to compare with the reference signal template. In an aspect, the method may further include converting the received electrical signal from the force sensitive sensor into frequency domain data, in which comparing the received electrical signal with a reference signal template includes comparing the sensor signal frequency domain data to a reference frequency domain template. In a further aspect, comparing the received electrical signal with a reference signal template, and determining whether the received electrical signal matches the reference signal template may include calculating cross-correlation values of a portion of the received electrical signal and each of a plurality of reference templates, determining a best correlation value, and determining whether the correlation value is above a threshold value. In a further aspect, comparing the received electrical signal with a reference signal template, and determining whether the received electrical signal matches the reference signal template may include converting at least a portion of the received electrical signal into a frequency domain signal portion, calculating cross-correlation values of the frequency domain portion and each of a plurality of reference templates, determining a best correlation value, and determining whether the correlation value is above a threshold value. In a further aspect, comparing the received electrical signal with a reference signal template, and determining whether the received electrical signal matches the reference signal template includes performing a hidden Markov model test on the received electrical signal from the force sensitive sensor. In a further aspect, comparing the received electrical signal with a reference signal template, and determining whether the received electrical signal matches the reference signal template includes calculating one or more signal vectors characterizing the received electrical signal from the force sensitive sensor, accessing a reference vector characterizing a reference signal, calculating a cosine value based on the received signal vector and accessed reference vector, and determining whether the calculated cosine value is less than a threshold value. In an aspect, the method may further include receiving a sensor input from another sensor, wherein identifying a functionality associated with a matched reference signal template comprises identifying a functionality associated both with the matched reference signal template and the sensor input received from the other sensor. In an aspect, the method may further include detecting a change in temperature based on the received electrical signal from the force sensitive sensor. In an aspect, the method may further include receiving a user identified functionality to be associated with the user input gesture, prompting the user to perform a user input gesture, receiving electrical signals from the force sensitive sensor, processing the received electrical signals from the force sensitive sensor in order to generate a reference signal template, and storing the reference signal template in memory in conjunction with the received user identified functionality. In a further aspect, the computing device may be a mobile device or a tablet computing device. In an aspect, the method may further include determining when a signal from a force sensor ceases, wherein implementing the identified functionality on the computing device is initiated when the signal from the force sensor ceases. In an aspect, the method may further include determining when a low battery power condition exists, wherein implementing the identified functionality on the computing device comprises initiating a telephone call in a minimum power state.

In a further aspect a computing device may include a case, a processor positioned within the case, a memory coupled to the processor, the memory storing a reference signal template, and a force sensitive sensor positioned on the case and coupled to the processor, in which the processor is configured with processor-executable instructions to perform operations including receiving an electrical signal from the force sensitive sensor, comparing the received electrical signal to the reference signal template, determining whether the received electrical signal matches the reference signal template, identifying a functionality associated with a matched reference signal template, and implementing the identified functionality on the computing device. In an aspect, the computing device processor may be configured with processor-executable instructions such that implementing the identified functionality on the computing device includes generating a user input event notification, and forwarding the user input event notification to an application executing on the processor. In an aspect, the force sensitive sensor is a piezoelectric sensor. In an aspect, the computing device processor may be configured with processor-executable instructions to perform operations further including filtering the received electrical signal for electromagnetic interference, converting the received electrical signal from analog to digital format, normalizing the received electrical signal in at least one of frequency and amplitude, and identifying a portion of the received electrical signal to compare with the reference signal template. In an aspect the computing device processor may be configured with processor-executable instruction to perform operations further including converting the received electrical signal from the force sensitive sensor into frequency domain data, in which the reference signal template is a frequency domain template, and in which the computing device processor is configured with processor-executable instructions such that comparing the received electrical signal with the reference signal template includes comparing the sensor signal frequency domain data to the reference frequency domain template. In an aspect, the memory may have stored on it a plurality of reference templates, and the computing device processor may be configured with processor-executable instructions such that comparing the received electrical signal with the reference signal template, and determining whether the received electrical signal matches the reference signal template includes calculating cross-correlation values of a portion of the received electrical signal and each of the plurality of reference templates, determining a best correlation value, and determining whether the correlation value is above a threshold value. In an aspect, the memory may have stored on it a plurality of reference templates, and the computing device processor may be configured with processor-executable instructions such that comparing the received electrical signal with the reference signal template, and determining whether the received electrical signal matches the reference signal template includes converting at least a portion of the received electrical signal into a frequency domain signal portion, calculating cross-correlation values of the frequency domain portion and each of a plurality of reference templates, determining a best correlation value, and determining whether the correlation value is above a threshold value. In an aspect, the computing device processor may be configured with processor-executable instructions such that comparing the received electrical signal with the reference signal template, and determining whether the received electrical signal matches the reference signal template includes performing a hidden Markov model test on the received electrical signal from the force sensitive sensor. In an aspect, the computing device processor may be configured with processor-executable instructions such that comparing the received electrical signal with the reference signal template, and determining whether the received electrical signal matches the reference signal template includes calculating one or more signal vectors characterizing the received electrical signal from the force sensitive sensor, accessing the reference vector stored in the memory, calculating a cosine value based on the received signal vector and the accessed reference vector, and determining whether the calculated cosine value is less than a threshold value. In an aspect, the computing device may further include another sensor coupled to the processor, in which the computing device processor is configured with processor-executable instructions to perform operations further including receiving a sensor input from the other sensor, in which identifying a functionality associated with a matched reference signal template includes identifying a functionality associated both with the matched reference signal template and the sensor input received from the other sensor. In an aspect, the computing device processor may be configured with processor-executable instructions to perform operations further including detecting a change in temperature based on the received electrical signal from the force sensitive sensor. In an aspect, the computing device processor may be configured with processor-executable instructions to perform operations further including receiving a user identified functionality to be associated with the user input gesture, prompting the user to perform a user input gesture, receiving electrical signals from the force sensitive sensor, processing the received electrical signals from the force sensitive sensor in order to generate a reference signal template, and storing the generated reference signal template in the memory in conjunction with the received user identified functionality. In an aspect, the computing device may be a mobile device or a tablet computing device. In an aspect, the computing device processor may be configured with processor-executable instructions to perform operations further including determining when a signal from a force sensor ceases, in which implementing the identified functionality on the computing device is initiated when the signal from the force sensor ceases. In an aspect, the computing device processor may be configured with processor-executable instructions to perform operations further including determining when a low battery power condition exists, in which implementing the identified functionality on the computing device comprises initiating a telephone call in a minimum power state. In a further aspect, the computing device may be configured so the force sensitive sensor is positioned on an external or an internal surface of the case. In a further aspect, the computing device may include a plurality of force sensitive sensors positioned on the case and coupled to the processor, which may be positioned on a back surface of the case and/or one or all sides of the computing device case.

In a further aspect a computing device, which may be a mobile device and a tablet computing device, may include means for accomplishing the function of the method aspects.

In a further aspect, a processor-readable storage medium may have stored thereon processor-executable instructions configured to cause a processor of a computing device to accomplish the operations of the method aspects.

BRIEF DESCRIPTION OF THE DRAWINGS

The accompanying drawings, which are incorporated herein and constitute part of this specification, illustrate exemplary aspects of the invention. Together with the general description given above and the detailed description given below, the drawings serve to explain features of the invention.

FIG. 2A being an elevation view, and FIG. 2B being a cross sectional view.

DETAILED DESCRIPTION

Figure 1:
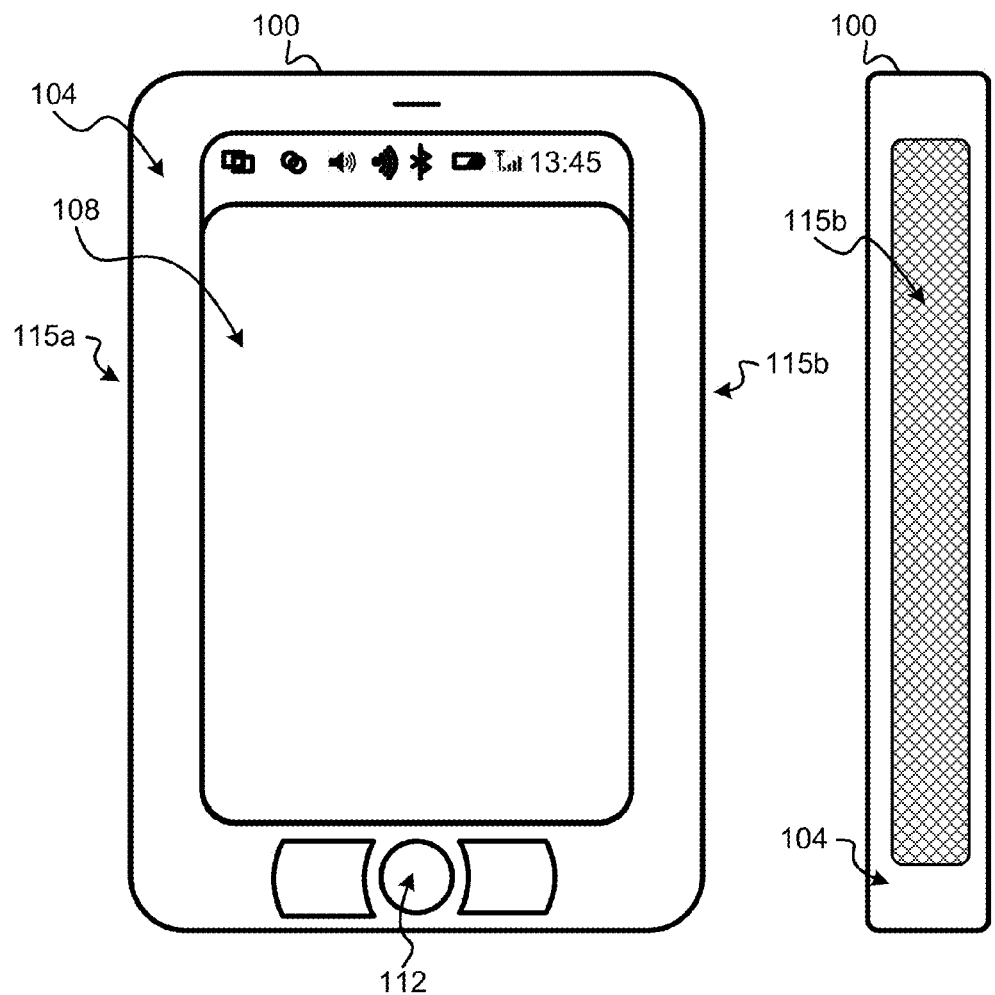
FIG. 1 is a front view and a side view of a mobile device including an aspect.

The various aspects will be described in detail with reference to the accompanying drawings. Wherever possible, the same reference numbers will be used throughout the drawings to refer to the same or like parts. References made to particular examples and implementations are for illustrative purposes and are not intended to limit the scope of the invention or the claims.

The word "exemplary" is used herein to mean "serving as an example, instance, or illustration." Any implementation described herein as "exemplary" is not necessarily to be construed as preferred or advantageous over other implementations.

As used herein, the terms "mobile device," "computing device" and "portable computing device" refer to any one or all of cellular telephones, personal data assistants (PDAs), tablet computers (also known as slate computers), palm-top computers, notebook computers, personal computers, wireless electronic mail receivers and cellular telephone receivers (e.g., the Blackberry® and Treo® devices), multimedia Internet enabled cellular telephones (e.g., the Blackberry Storm®), and similar electronic devices that include a programmable processor, memory, and force sensitive membranes were similarly touch sensors as described herein.

Mobile devices are increasing indispensable. From telephone calls to texting to sending/receiving e-mail to surfing the Internet, mobile device users are spending more and more time interfacing with their devices. Mobile devices typically employ a variety of user interface technologies, such as buttons, scroll wheels, trackballs and touch sensitive surfaces. Many mobile phones today include touch screen displays that recognize user input gestures such as tapping, dragging and swiping. Mobile devices are also being implemented in new forms replacing traditional media, such as electronic book devices, electronic photo frames, and slate-like or tablet computers which have limited real estate for user interface devices.

While most mobile device user interfaces are easy to use, they typically require the user's focused attention to see the item being pressed or the response of the user input on a display screen. This need to pay attention to the mobile device user interface may distract users when they are using their mobile device while performing operations that require their full attention, such as driving a car. Also, many mobile device user interfaces require two hands to operate; one hand to hold device so that the fingers of the other hand can interact with the interface, such as touching icons on a touchscreen display. Consequently, many mobile devices have reduced utility when only one hand is available, such as while holding an umbrella.

New forms of mobile devices, such as tablet computers and electronic book display devices, are being implemented with large displays, such as 12-inch and larger LCD displays, for which the center of gravity is too far from the edges to be comfortably held in a single hand. Such devices will be more comfortably held with two hands. However, this configuration makes it difficult for users to interface with a conventional keyboard without having to put the device down on a table or lap. Such devices would thus benefit from a user interface that can be manipulated while being held with both hands.

Mobile device user interfaces typically comprise an input device (e.g., a button) connected to a central processing unit via one or more signal processing circuits. The mobile device will typically have an operating system implemented on the central processing unit that has the capability to receive and interpret input signals from input devices. The operating system may also convert the received signal to a form suitable for use with the various applications running on the mobile device. For example, when a user presses a button on the mobile device, the operating system may receive and electrical signal initiated by the button, and in response, send a suitable interrupt to an executing application. The interrupt may be recognized by the application as a notification of a button press or touch to a displayed icon on a touchscreen, and cause the application to execute a predefined function coded specifically to respond to the indicated button press or touchscreen touch event. Such a function may be referred to as an event handler or an "onclick" function. Some mobile devices may include a window manager as part of the operating system. The window manager may be responsible for receiving signals from input devices and routing the signal to the proper application.

The various aspects implement sensors which generate a signal in response to an applied force or pressure or to strain (e.g., bending or stretching) that may be implemented on the case of a mobile device in order to enable user input gestures to be performed on portions of the mobile device case. Such sensors may be made of a variety of materials and configurations, and may generate signals in response to applied force, such as pressure, strain (e.g., bending or stretching), and acoustic waves (e.g., sound and vibration). Such sensors may be able to measure or sense static pressure as well as strain, and static as well as dynamic forces and strain. For ease of reference, such sensors are generally referred to herein as force sensitive sensors or elements; however, such reference to "force sensors" is not intended to limit the scope of the claims to so as to exclude any of pressure, strain and acoustic waves.

The force sensitive elements may generate an electrical signal in response to a gesture, such as a squeeze or a swipe. The properties of the generated electrical signal may be compared to various reference signal templates that may be stored in a reference signal database to recognize particular input gestures. The force sensitive elements may operate in conjunction with more traditional input methods, such as touchscreen display and electromechanical buttons. By enabling user input gestures on the case of mobile devices, the various aspects permit one hand operation of the devices including intuitive gestures that do not require the users focused attention to accomplish. Thus the various aspects may enable users to utilize their mobile devices in situations not suitable to conventional user input technologies.

An example of a mobile device with force sensitive surfaces is illustrated in FIG. 1, which shows a front and side view of a mobile device. The mobile device 100 may include a plurality of input buttons 112 and and/or a touchscreen display 108. The mobile device 100 includes a case 104 which may be a metal alloy, a plastic, or any substance typically used for mobile device housings. In the various aspects, the mobile device 100 also includes one or more force sensing materials implemented on or within the case material in the form of force sensitive input strips 115*a*, 115*b*. In the exemplary aspect shown in FIG. 1, the force sensitive input strips 115*a*, 115*b* are positioned on each side of the device. So positioned, the force sensitive input strips 115*a*, 115*b* can measure the force asserted by a user's fingers holding the mobile device in the customary manner.

Since the force sensitive input strips 115*a*, 115*b* are positioned on the portions of the mobile device that are touched or grasped by a user holding the device, the technologies used in conventional touch surface and touchscreen user input devices are not appropriate in the various aspects. Such user input technologies are configured to sense a light touch and have limited ability to distinguish multiple simultaneous touches. In the various aspects, the force sensitive input strips 115*a*, 115*b* are intended to be touched and grasped continuously while a mobile device is in use. Therefore, the various aspects employ sensor materials and discrimination techniques which enable user inputs to be recognized even though the material is being touched continuously.

The force sensitive input strips 115*a* and 115*b* may be made of any material capable of generating a measurable electrical signal in response to applied force or pressure, or induced strain (e.g., bending from the application of force) or acoustic wave (which is a form of strain). The force sensitive input strips 115*a* and 115*b* may be placed on the exterior of the mobile device so that the sensors can generate a signal in response to user actions such as from a user tapping, squeezing, and/or swiping a finger on the material itself. Alternatively, the force sensitive input strips 115*a*, 115*b* may be adhered to the inside of the mobile device case and generate a signal in response to vibrations and distortions of the case caused by a user pressing, tapping, twisting or swiping the outside surface of the case. The force sensitive strips may also be any material capable of generating an electrical signal in response to transducing acoustic waves, strain, or vibrations in the material.

Figure 2A:
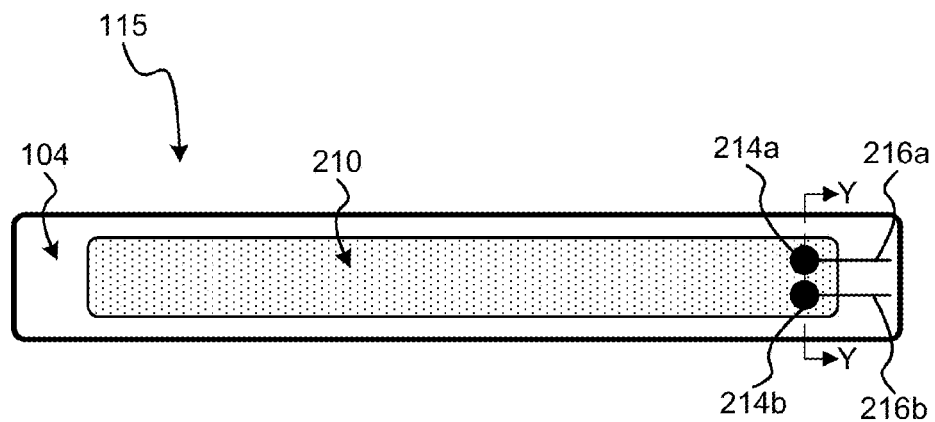
FIGS. 2A and 2B illustrate a force sensor suitable for use with the various aspects.

An example of a suitable sensor is based upon piezoelectric materials, which are well known materials that generate electric current in response to strain, such as may be caused by impacts or applied forces. For example, the force sensitive input strips may be formed from one or more strips of piezoelectric material 210 ("piezo strip"), such as shown in FIG. 2A. An example piezo strip 210 that is commercially available is marketed as Piezo Film, which is a product offered for sale by Measurement Specialties, Inc. of Hampton, Va. The Piezo Film product is a piezoelectric film which will produce a voltage in response to strain (i.e., stretching, bending or compression). Another force sensing material that may be used in an aspect is a printable resistive material that may be printed and formed into a variety of shapes in thin films and membranes that can be formed around shapes. In general, bending of a piezoelectric material film will produce a voltage. Also, if the piezoelectric material film is adhered to a surface, the film will produce a voltage as vibrations move across the surface, which outputs a voltage waveform.

FIG. 2A shows a force sensitive input strip 115 attached to a side panel of the mobile device case 104. The force sensitive input strips 115 may include a piezo strip 210. The piezo strip 210 is configured to generate a voltage signal in response to applied forces which cause some change of shape or strain in the material. The generated voltage may be collected by electrical contacts 214*a*, 214*b* which are in electrical contact with the piezoelectric material and with electrical leads 216*a*, 216*b* which can direct generated signals to signal processing circuits within the mobile device case 104.

Figure 2B:
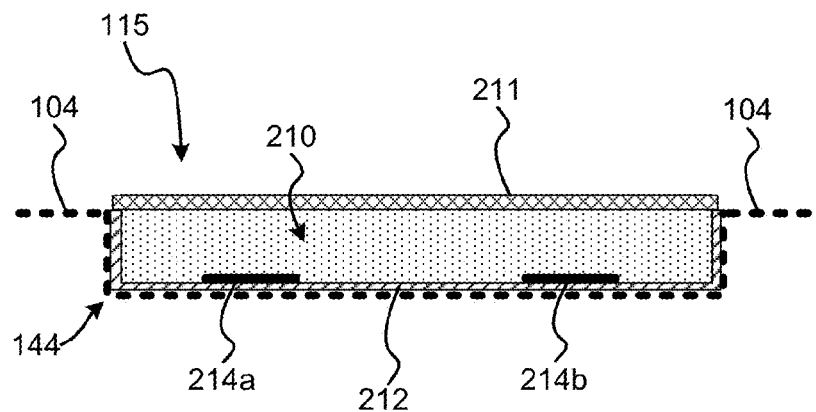

FIG. 2B shows a cross-section Y-Y of an aspect configuration of a force sensitive input strips 115 attached to the case 104 of a mobile device. The piezo strip 210 may be covered by a flexible membrane 211 which protects the piezoelectric material while allowing the piezo strip 210 to receive forces applied via a finger or thumb applied to the surface. The flexible membrane 211 may also protect the strip from short circuiting or receiving an extraneous external voltage. The flexible membrane 211 may be made from plastic or rubber-type materials which can provide flexible protection for the underlying piezoelectric material as well electrical insulation.

The piezo strip 210 may be mounted on the case 104 of a mobile device in a variety of configurations. For example, the piezo strip 210 may be applied directly to the exterior surface of the case 104, such as by means of an adhesive. In such a configuration, the piezo strip 210 may be slightly raised above the rest of the exterior surface of the case 104. In another configuration illustrated in FIG. 2B, the piezo strip 210 may be applied to a depression 144 formed or milled into the case surface that is configured so the flexible membrane 211 is approximately flush with rest of the mobile device case 104. In an aspect, the interior portion of the piezo strip 210 may be surrounded or framed by an insulating container 212 of encapsulating material to protect the strip from exposure to air and moisture and protect against short circuiting or receiving an extraneous voltage on the backside. In an aspect, the container 212 may be a rigid to provide support for the piezo strip 210, such as to prevent bending of the strip. The electrical contacts 214*a*, 214*b* may be contained within the insulating container 212 and directly contact the piezo strip 210.

While FIG. 2B shows the piezo strip 210 mounted on the exterior surface of the case 104, the sensor may alternatively be attached to an interior surface of the case 104. Positioned on an interior surface, the piezo strip 210 will generate voltage signals in response to vibrations passing through along the case wall, such as taps on the exterior of the case, and bending of the case wall, such as may occur when the case is squeezed by a user. To enable a piezo strip 210 positioned inside the case of the mobile device to be sensitive to squeeze gestures (i.e., application of force or pressure to the sides of the mobile device), the case may be configured of materials of appropriate thickness so that the case wall will deform in response to pressure applied by the fingertips of the user. A piezo strip 210 adhered to an internal surface of a case wall will experience bending strain when the case wall is deformed. However, to detect taps on the case, the case material need not be deformable.

As is well known, piezoelectric materials generate a slight voltage in response to applied pressures or forces which distort the material. Such voltages may be very short in duration when the applied force is a momentary tap or acceleration, and may vary with temperature. Also, various aspects anticipate that the piezo strip 210 will be touched even when user input gestures are not being executed (i.e., when the surfaces being grasped by the user holding the device). Additionally, users holding or manipulating their mobile devices will continuously apply forces to the piezo strip 210 that are not associated with user input gestures, such as repositioning fingers on the case 104 and picking up the device, in addition to forces caused by accelerations due to movement, such as while walking or riding in a car. Therefore, the various aspects include methods for analyzing the electrical outputs from piezo strip 210 sensors to recognize patterns corresponding to user input gestures within a background of bias voltages and miscellaneous "noise."

In the various aspects, the user input gestures may be defined to be those which generate recognizable patterns of voltage signals generated by the piezo strip 210 in response to the applied pressure or forces. For example, user input gestures may be in the form of a series of taps which may be recognized and counted, one or more squeezes which apply pressure to particular locations (such as above opposite sides of the device) above a threshold value and exhibiting a recognizable pattern, sliding touches which may exhibit a different characteristic signal patterns, scratching of the surface with a fingernail or implement which may exhibit characteristic signal patterns, and flexing of the mobile device case (or parts of the case) which may be sensed by appropriately positioned piezo strip 210 (e.g., shown in FIG. 14).

A variety of touch sensing and/or force measuring sensor technologies may be used. As shown below, piezoelectric sensor technology ("piezo sensor"), such as piezo strips 210, provide a suitable sensor technology that may be utilized. Other technologies may be used, such as resistive strain gage sensors which change resistance in response to strain (i.e., distortion), capacitive sensors and inductive sensors. The methods of the various aspects can be used with all sensor technologies in a manner very similar to that for piezo sensors. Therefore, for ease of description, the various aspects are described with reference to piezo sensors (e.g., piezo strips 210). However, such descriptions are not intended to limit the scope of the claims to a particular sensor technology unless specifically so recited.

Figure 3:
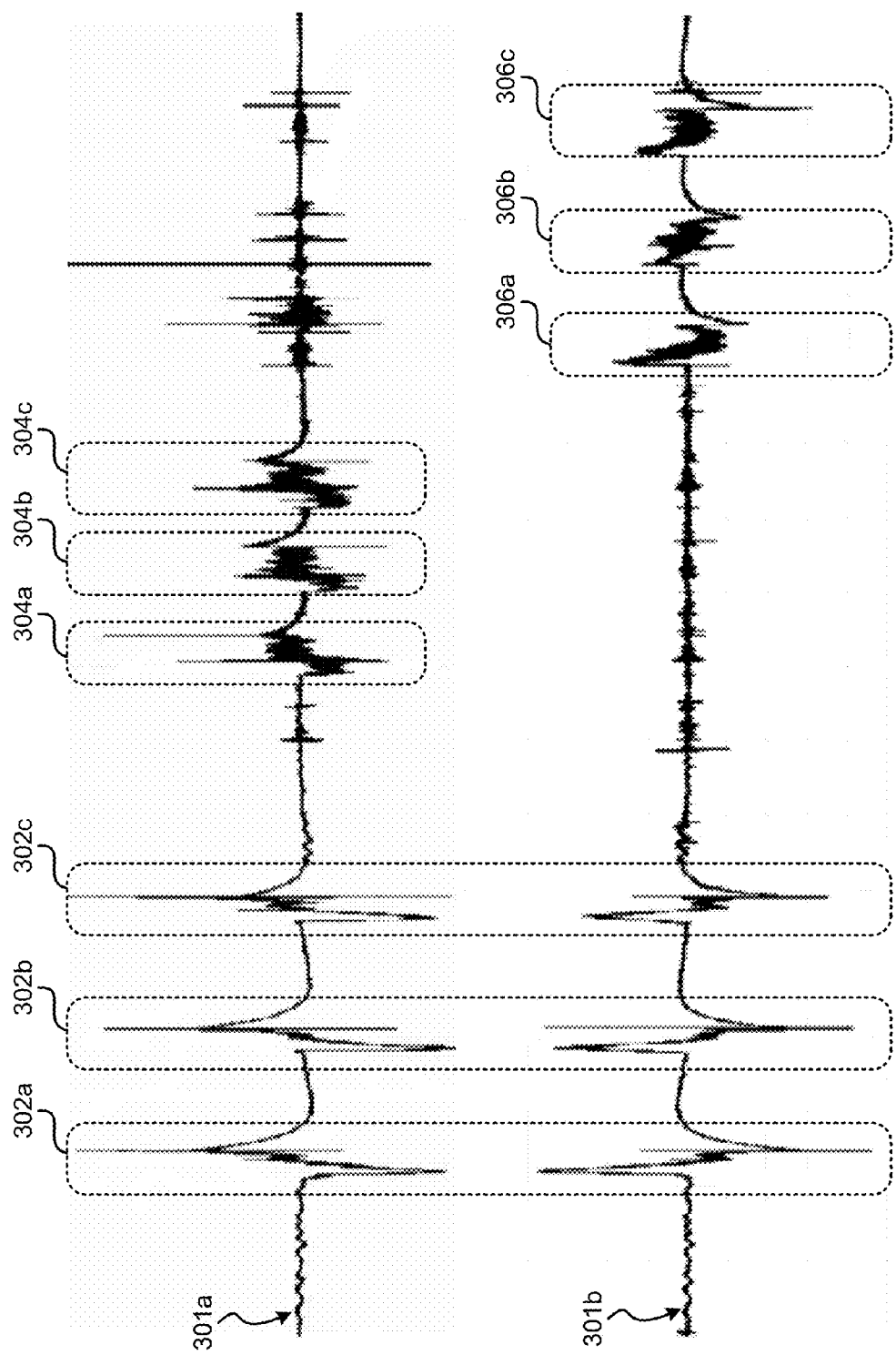
FIG. 3 is a graph of electrical signals generated by two force sensitive membranes implemented on an aspect prototype.

The viability of such pattern recognition methods is demonstrated by the signal plots shown in FIG. 3 that were obtained from a prototype of a particular aspect. In this prototype test, a mobile device was equipped with two piezo strips positioned on either side of the case is illustrated in FIG. 1. The two voltage waveforms 301a, 301b were received from the two piezo sensors in response to specific input gestures. Three squeeze gestures in succession (i.e., squeezing the mobile device on both sides) produced the waveforms labeled 302a-302c. In the wiring configuration implemented on the prototype, the squeeze gestures generated recognizable voltage signals on both sides, with the right piezo strip producing a signal similar in magnitude but opposite in polarity to the voltage signal produced by the left piezo strip. Three swiping gestures performed by sliding a finger or thumb along the right side produced the voltage signals labeled 304a-304c. Similarly, three swipe gestures performed on the left side produced the voltage waveforms labeled 306a-306c. For example, the squeeze gesture exhibits a large amplitude, with approximately equal amplitude from sensors on both sides of the mobile device (as would be expected when the device is squeezed on both sides). In addition to the obvious differences in amplitude, shape and duration of the wave forms generated by slide gestures (i.e., voltage waveforms labeled 304a-304c and 306a-306c), slide gestures are asymmetrical, such that the characteristic waveforms are generated by sensors on one side of the device, but not the other side. The obvious differences in shape, magnitude and duration of voltage signals between the squeeze and swipe gestures illustrate waveform characteristics that may be recognized using a variety of analysis algorithms. The various aspects can utilize such signal characteristics to distinguish intentional gestures from the background noise generated from normal handling of the device.

Figure 4:
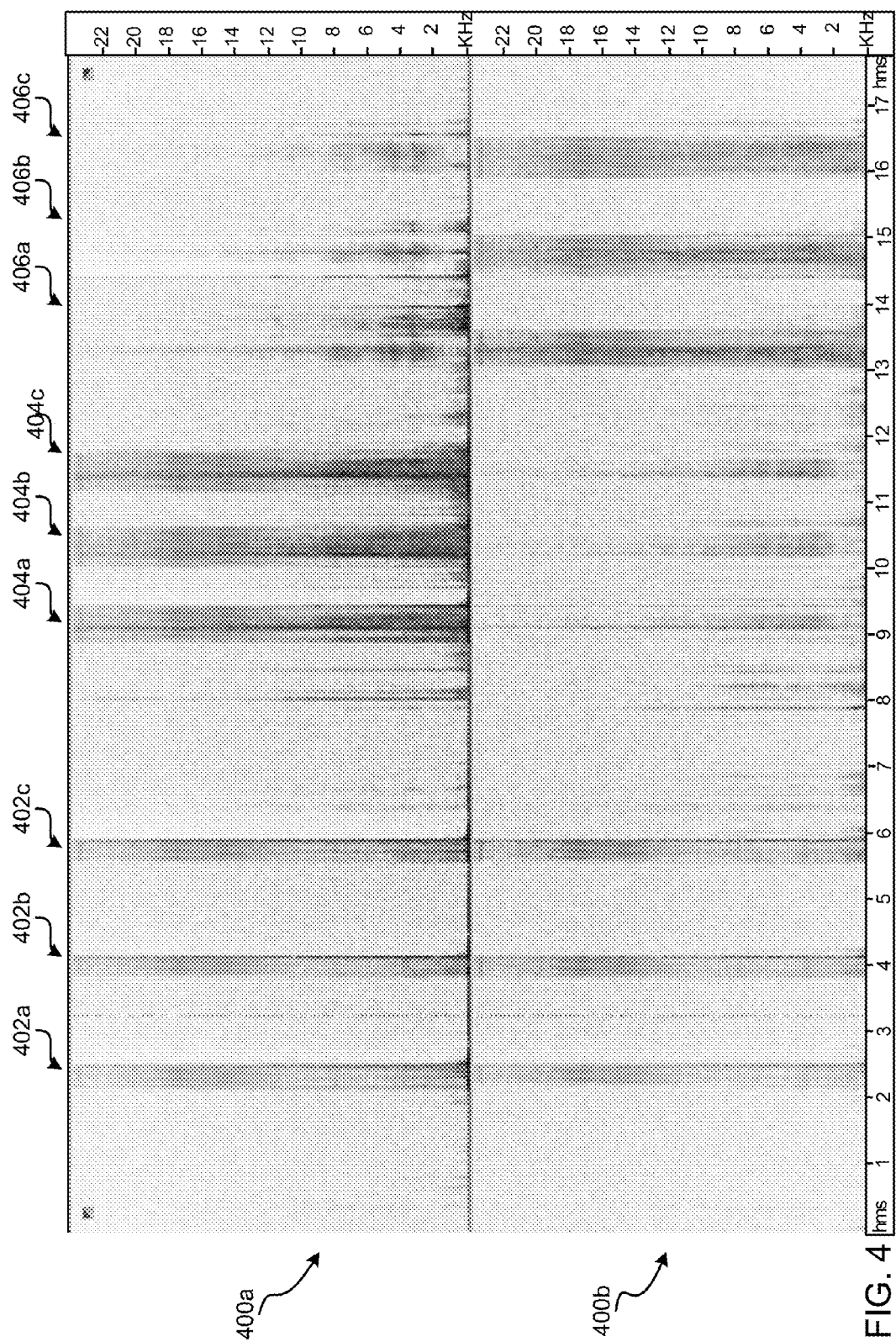
FIG. 4 is a frequency-domain plot of the two electrical signals illustrated in FIG. 3.

The various aspects provide circuits and methods for processing the electrical signals produced by touch sensing/force measuring sensors positioned on the mobile device case 104, such as piezo strips 210, in order to recognize predefined patterns and determine corresponding commands to be implemented by the central processor unit. Since the output from touch sensing/force measuring sensors may be in the form of transient voltages or electric currents, a mobile device processor, or a processor dedicated to the touch sensing/force measuring sensors, may be configured to recognize spectral and temporal patterns in the signals received from surface mounted touch and force sensors. For example, FIG. 4 shows a combination temporal and spectral plot of the electrical signals received from the prototype mobile device in the squeeze and swipe events shown in FIG. 3. Tapping and squeezing surfaces including one or more touch and force sensors will produce electrical signals that exhibit varying the frequency characteristics. For example, the squeeze events 402a-402c can be easily recognized based upon the broad frequency response of the sensor, while swipe events 404a-404c and 406a-406c exhibits a different frequency range response.

FIG. 4 also illustrates that a significant amount of information can be obtained from the touch sensing/force measuring sensor signals within the frequency range of 1 kHz to 10 kHz where much of the signal energy resides, enabling the signal processing to be truncated (e.g., by filtering) to that reduced frequency range. Filtering of higher frequencies is advantageous to remove electromagnetic interference (EMI) from external radio frequency signals. Filtering of frequencies below 1 kHz is also advantageous because such filtering can eliminate EMI from power distribution circuits, which can lead to signals at 60 Hz in the United States (50 Hz in other countries) and harmonics thereof (i.e., 120 Hz, 180 Hz, etc.), as well as EMI from external sources, such as fluorescent lights.

FIGS. 3 and 4 together illustrate how different types of tap, swipe and squeeze events can be identified and discriminated using signal analysis in both the temporal and frequency domains. Methods for recognizing signal patterns in both temporal and frequency domain are well known from the communication arts, and may be applied in a similar manner to the interpretation and recognition of touch, swipe and squeeze events occurring on a mobile device configured with surface mounted touch and force sensors of the various aspects.

Figure 5:
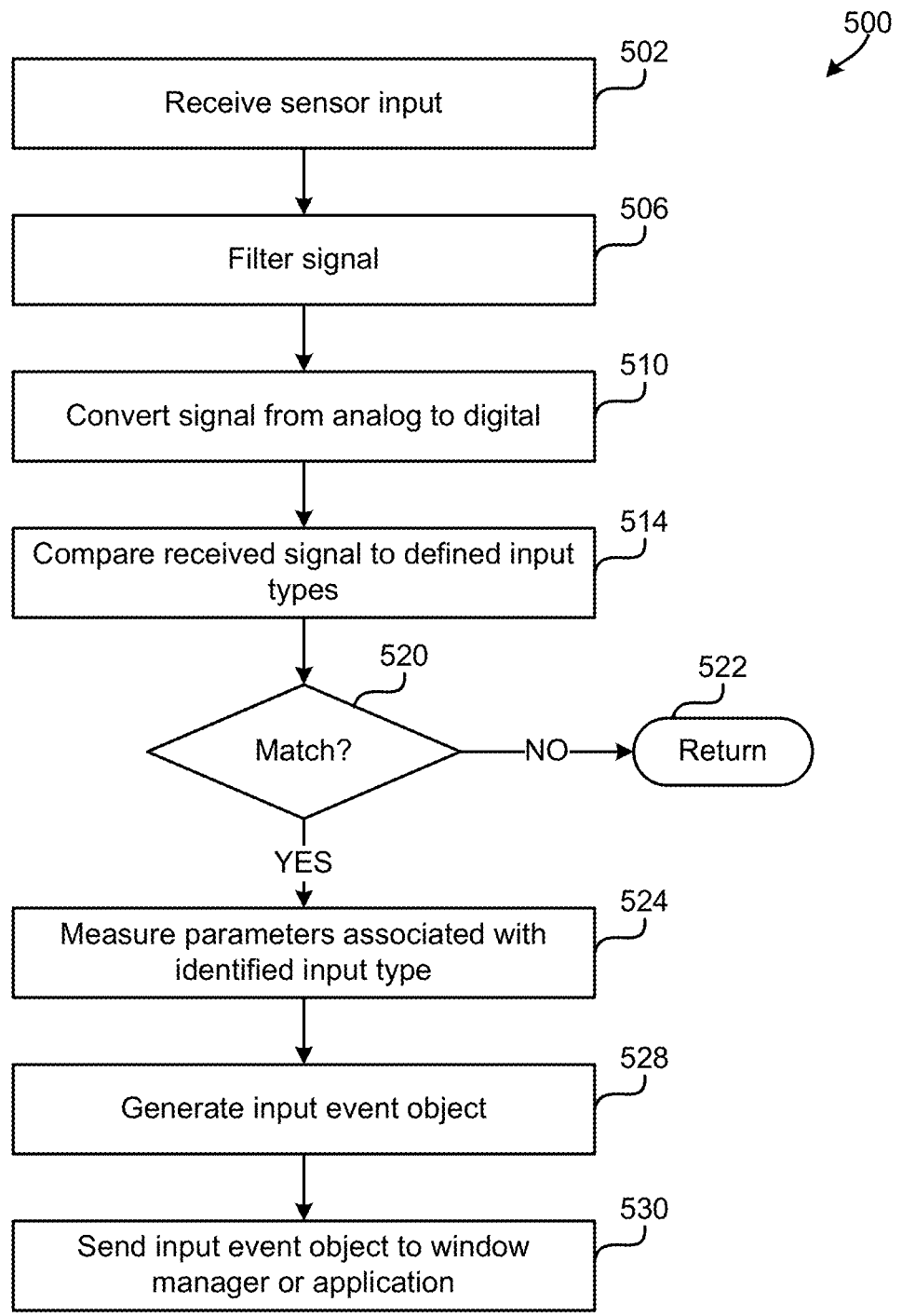
FIG. 5 is a process flow diagram of an aspect method for implementing gesture functionality on mobile devices equipped with force sensitive membranes.

To convert the voltages received by the touch sensing/force measuring sensor (e.g., piezo sensors) to an input event object that would be suitable for use with mobile device applications, a mobile device may perform a series of operations in software and hardware components of the mobile device. FIGS. 5-7 illustrate example processes for recognizing gestures within signals received from piezo sensor and identifying corresponding command inputs. The various operations illustrated in touch sensing/force measuring sensor and described below may be implemented in software, in circuitry, and in a combination of software and circuitry, including dedicated signal processing chips and special purpose or general purpose processors configured with software instructions. Further, the processes may be implemented within or among the various software components of the mobile device operating system, including one or more device drivers and a window manager.

An overview method 500 for converting piezo sensor signals into an input event object is shown in FIG. 5, which shows process steps that may be implemented on a mobile device. In method 500 at block 502, a signal generated by a piezo sensor may be received via a lead 216*a*, 216*b* coupled to a signal processing circuit. The signal received from the piezo sensor may be filtered at block 506. As would be appreciated by one of skill in the art, such filtering may be performed in circuitry (e.g., by passing the input signal through a filter circuit), in software (e.g., by processing signal components in a digital signal processor (DSP) using a mathematical filtering algorithm), and a combination of both (e.g., by passing the signal through a band pass filter circuit and then applying filtering algorithms to the resulting signal in a DSP). In an aspect, the filtering accomplished in block 506 may be performed to remove EMI from power distribution frequencies and harmonics thereof (e.g., 60 Hz, 120 Hz, 180 Hz), as well as other common EMI sources, such as fluorescent lights. As discussed more completely below with reference to FIGS. 14A and 14B, the filtering in block 506 may also filter out voltage spikes above a maximum threshold to protect processor circuitry (e.g., a DSP) that could occur if a piezo sensor is subjected to a large sudden force or shock (e.g., if the mobile device is dropped). At block 510 the analog input signal may be converted to digital data, such as in an analog-to-digital converter circuit. The conversion will typically be performed using a sampling rate within the range 1 kHz to 192 kHz, but the particular sampling rate or rates suitable for an implementation may vary according to the particular implementation. In implementations where filtering is accomplished using a filtering algorithm, the analog-to-digital conversion of block 520 may be accomplished before some or all filtering of block 506.

At block 514, a processor of the mobile device may compare the characteristics of the processed input signal with parameters corresponding to ideal input types at block 514. For example, the mobile device may have stored in a database one or more predefined waveform representations or characteristic parameters corresponding to each recognized input gesture. For example, the mobile device processor may compare the received input signal data with stored patterns or characteristics of a signal expected from a squeeze input gesture to determine a degree of similarity. The mobile device may then determine if the degree of similarity between the received signal and any of the stored signal patterns or characteristics is sufficient to recognize a match at determination block 520. If no match is detected (i.e., determination block 520="No"), the input signal may simply be ignored and processing returned to a previously running process at block 522.

If the processor determines there is a match (i.e., determination block 520="Yes"), the processor may take additional measurements or note other data relevant to the matched input gesture. For example, if the mobile device recognizes a tap input, the mobile device may measure the tap force and duration from the input signal. Alternatively, if the mobile device recognizes a swipe input, the mobile device may measure the starting location, speed, direction, and length of the swipe. The mobile device may also access other sensors for information relevant to processing the matched input gesture. For example, if the processor recognizes a squeeze gesture, the processor may access an accelerometer to determine if the mobile device is being squeezed and shaken simultaneously. As another example, the if the processor recognizes a squeeze gesture, the processor may access an accelerometer to determine if the mobile device is oriented vertically or horizontally, and use the orientation to determine the correct function to implement. For example, if the processor detects a squeeze gesture and an accelerometer input indicates that the mobile device is oriented horizontally, the processor may interpret the squeeze gesture as a command to activate a camera application or take a digital photograph.

At block 528 may generate an input event object based on the matched input gesture and other accessed data, and forward the generated input event object to an application or to the window manager at block 530. Similar to a typical mobile device, a force sensor input recognized to be equivalent to a button click event may be sent to an application as an onclick object in a manner that causes an onclick function to execute. Such an onclick object may include parameters such as the identifier of the button clicked or the position of the pointer at the time of the click. An input event such as a squeeze may be handled in a similar manner. Alternatively, an input device driver may generate the input event object. The input event may be forwarded to an application at block 530 and it may be handled or ignored by the application. For example, the application may be a user-level application such as a camera or may be a lower level application such as the phone or simply another portion of the operating system.

The process for recognizing sensor signals in block 514 may be accomplished using a variety of methods. The possible methods include a time-domain cross-correlation method, a frequency-domain cross-correlation method, a hidden Markov model method, and a vector space model method. Further, the various methods may be employed in sequence, in parallel, and in a weighted probabilistic method. The objective of the signal analysis methods is to recognize signal patterns corresponding to predefined user input gestures while ignoring signals due to noise and random manipulation of the mobile device. Three examples of processing methods are described below with reference to FIGS. 6A, 6B and 7.

In order to enable the recognition and correlation of received piezo sensor signals to particular input gestures and functions, a reference database of sensor signals or characteristics (also referred to herein as reference signal templates) may be prerecorded and stored in memory in a variety of forms. The reference database may contain pre-recorded sensor output signals received during particular user interactions and gestures, such as in a training process, as described more fully below. The reference database may also contain predetermined signal patterns, such as signal patterns defined by the manufacturer. Depending upon the type of correlation mechanism used, the prerecorded reference database may include time-domain signal data, frequency-domain data (i.e., signal data that has been converted to the frequency domain before saving), data that may be used in a hidden Markov model comparison or Bayesian analysis method, vector space modeling of sensor signal characteristic vectors, and combinations of these different data formats. The reference database may be stored as PCM, WAV, MP3, or other suitable data format for representing sensor waveform data. The reference database may be stored in internal memory of the mobile device, on a removable memory chip (e.g., a SIM card), or a combination of internal and removable memory.

Figure 6A:
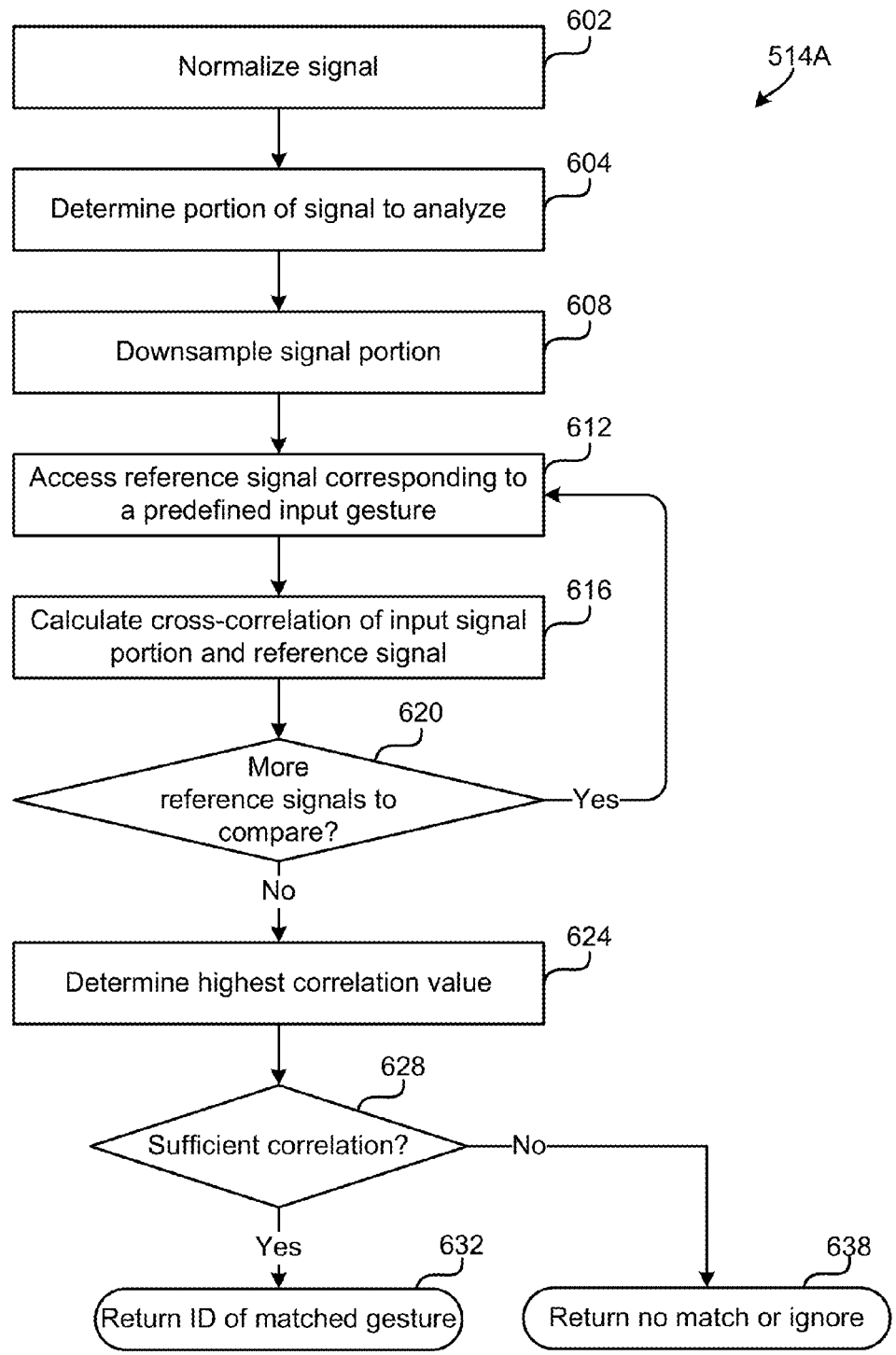
FIG. 6A is a process flow diagram of another aspect method for implementing gesture functionality on mobile devices equipped with force sensitive membranes.
Figure 7:
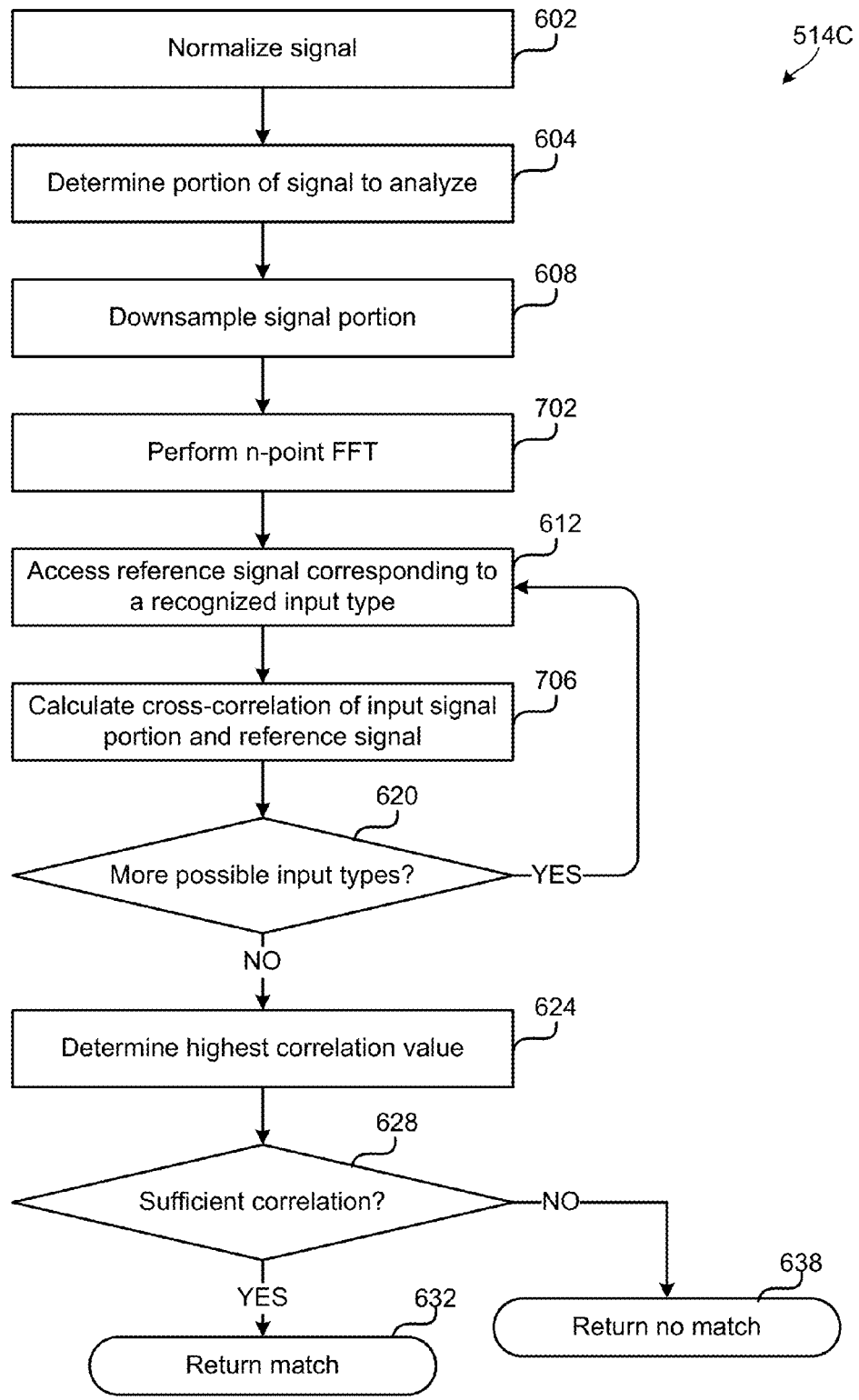
FIG. 7 is a process flow diagram another aspect method for implementing gesture functionality on mobile devices equipped with force sensitive membranes.

An example time-domain cross-correlation method 514A is illustrated in FIG. 6A. In this method, the received signal is analyzed in the time-domain (e.g., as received) to compare and correlate the signal to time-domain waveforms stored in memory to identify a most likely match and a measure of the correlation of the input signal to the stored waveform. In method 514A the received piezo sensor signal may be normalized at block 602. As part of such a normalizing process, the received signal data may be scaled or normalized in amplitude or frequency. Such normalizing may be accomplished using a method and parameters that were used to normalize a reference signal database, so that the normalizing of the received signal prepares it for comparison with the reference database.

In method 514A at block 604, the processor may analyze the received signal to determine the portions of the input signal to analyze. As illustrated in FIG. 3, signals associated with an input gesture will be interspersed by long periods of random noise and signal input. Thus, the processor may analyze the stream of incoming signals to distinguish the signals which should be analyzed, such as compared to a reference database, while ignoring those signals that are associated with noise. One method that may be used in block 604 for recognizing an input signal that has the potential of being an input gesture (i.e., a signal that should be analyzed) involves zero cross point detection, which notes the frequency at which the input signal crosses the zero value. As illustrated in FIG. 3, random noise may be recognized by the frequency at which the zero point this crossed, so that an idle state (i.e., a state in which no gesture is being input) may be recognized by closely spaced (i.e., frequent) zero crossing points, while potential input gestures (e.g., detected as a flexing or tapping signal) are recognized by a change to more widely space (i.e., abrupt reduction in frequency) zero crossing points. Using this method, the processor may recognize a potential user input by an abrupt increase in the spacing of zero point crossings, and continue to sample/analyze the signal untold the zero point crossing frequency returns to that characteristic of an idle state.

Another method for recognizing an input signal that has the potential of being an input gesture (i.e., a signal which should be) in block 604 may involve calculating a pointwise deviation or standard deviation of the received signal from a trailing average of several signal measures including the total RMS or peak energy threshold across all frequencies. As illustrated in FIG. 3, a user input, such as a squeeze or swipe on a piezo sensor results in an output signal that is significantly different than the baseline noise. Thus, comparing each signal point to a trailing average signal level can be used to recognize a significant departure from averaged which can be compared to stored signal patterns.

Another method for recognizing an input signal that has the potential of being an input gesture in block 604 involves comparing the RMS or peak energy of the entire signal, or a portion of the signal, such as at a given frequency, a given frequency range, at multiple frequencies, or multiple frequency range bins to one or more threshold values. For example, as shown in FIG. 3, the average RMS energy of the received signal between user input gestures is low, while the RMS energy of the received signal during an input gesture is much higher. Thus, an input signal worthy of analysis may be one whose energy exceeds a threshold value. Such a threshold may be determined by the manufacturer as a value below which it is presumed that a user input gesture is not be made. Alternatively, the threshold value may be set based upon user training inputs, as described more fully below. As shown in FIG. 4, the amplitude of the frequencies included in a piezo sensor signal output during a user input gesture include measurable energy in frequencies in the range of 1 kHz to 10 kHz, while the baseline signal (i.e., the signal between user input gestures) does not. Based on production model testing, or user training, particular frequencies or frequency bins may be identified which typically exceed a threshold value during a user input gesture, but not during other use. In this method, a circuit may continually sample the input signal and compare the RMS value, or the RMS value of a particular frequency range, to a threshold, and output an interrupt (or other signal) to indicate when the input signal should be analyzed. Analysis of the input signal may then continue until the signal falls back below the same or another threshold value for a predetermined amount of time.

In another aspect, the input signal may simply be may analyzed continuously by comparing the signal to one or more templates to determine whether there is a match. In this aspect, the block 604 may be unnecessary.

When an input signal is recognized as having the potential of being an input gesture in block 604, the processor may begin downsampling the incoming signal and storing the results in memory (e.g., a temporary buffer) at block 608 to obtain signal data for comparison to predetermined or prerecorded signal patterns. Downsampling of the incoming signal may reduce the amount of signal processing required in the correlation process, thereby rendering the analysis less resource intensive as well as reducing the size of the memory required for storing the input signal. Alternatively, the processor may store the entire waveform (i.e. the full-bandwidth sensor output) in memory and downsample portions of the stored signal from memory on the fly or during the cross correlation process.

With the received signal stored in memory, the signal may be compared to each reference signal in the reference database. In an aspect, this comparison may be performed in an iterative manner as illustrated in FIG. 6A. Thus, at block 612, the processor may access a reference signal stored in memory corresponding to a first predefined user input gesture. At block 616, the processor may calculate a cross correlation between the input signal portion and the reference signal at block 616. This time-domain comparison between the stored input signal and a pre-recorded waveform may employ well known statistical analysis techniques to determine a degree of similarity or correlation value. As part of block 616, the calculated similarity or correlation value may be stored in a buffer along with the corresponding input gesture to enable the processor to determine a best match (i.e., best correlation value) among all of the prerecorded waveforms. The similarity or correlation value may also be compared to a threshold value so that only those patterns that closely match the input signal are considered further. At determination block 620, the processor may determine if there is another reference signal stored in memory for comparison. If so (i.e., determination block 620="Yes"), the processor may access the next reference signal at block 612 and calculate another similarity or correlation value at block 616. Once the input signal has been compared to all of the stored reference signals (i.e., determination block 620="No"), the processor may determine the reference signal with the highest similarity or best correlation value, and thus best matching the received input signal, at block 624. At determination block 628, the processor may determine whether the determined highest similarity or best correlation value is sufficient to justify returning a match at block 632. This determination helps to reduce the frequency of false positive correlations which could be annoying to users if random handling of their mobile device frequently generated a function response not intended by the user. It is worth noting that, depending upon the algorithm or formula used to calculate the correlation value, best correlation may be indicated by the largest or a lowest calculated value. Thus, the threshold used to determine whether a correlation value is sufficient may be either a maximum or minimum value. If the similarity or correlation value insufficient (i.e., determination block 628="Yes"), the processor may return an identifier of the correlated input gesture to a window manager or an application at block 632. If not (i.e., determination block 628="No"), the processor may return a no match indication or simply ignore the sensor input at block 638.

Figure 6B:
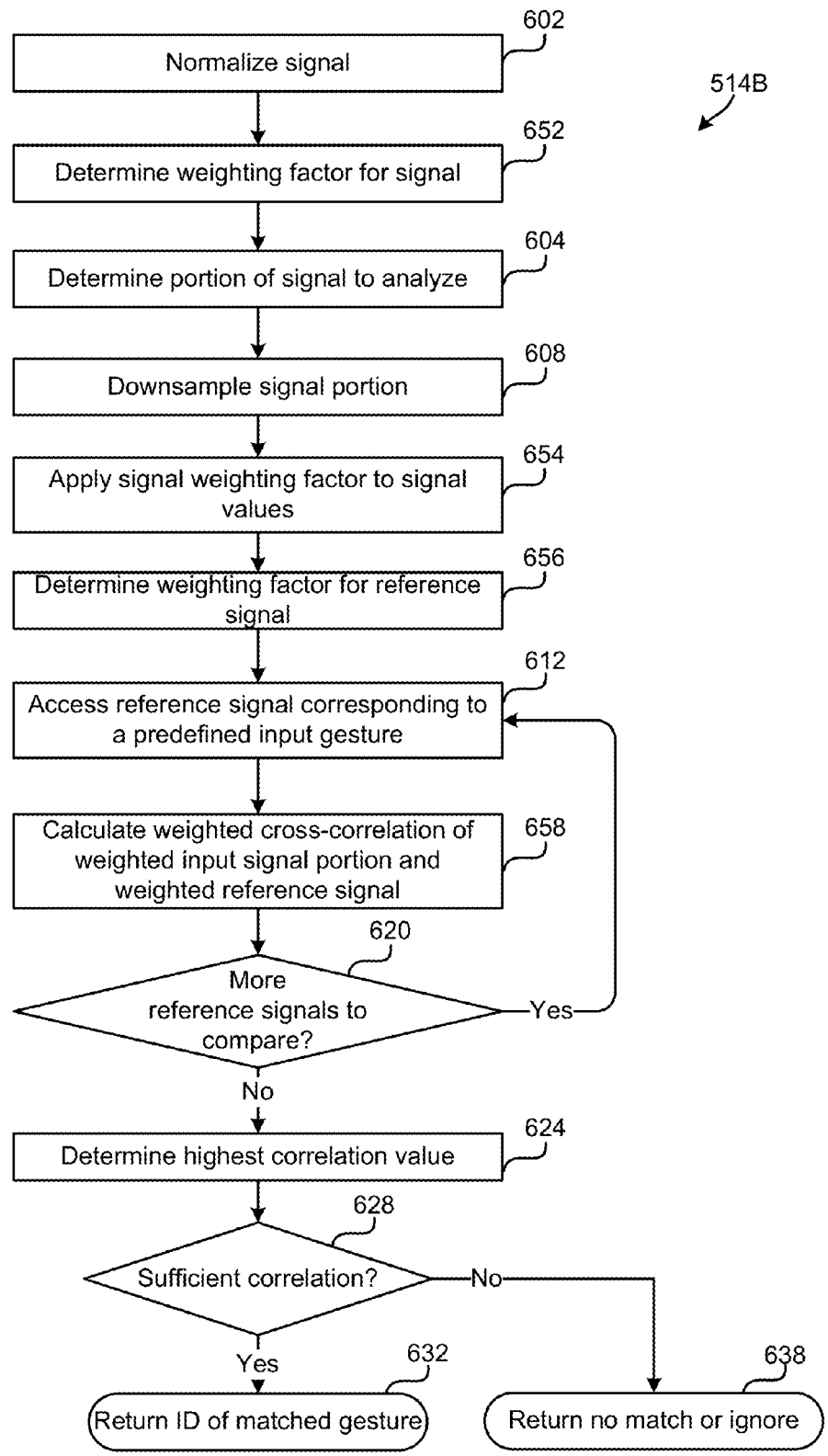
FIG. 6B is a process flow diagram of another aspect method for implementing gesture functionality on mobile devices equipped with force sensitive membranes.

As a further refinement shown in method 514B illustrated in FIG. 6B, one or both of sensor input signals and reference signal database entries may be assigned a weighting factor before or after cross correlation. Weighting factors may be applied to the prerecorded reference signals, to the received sensor input signal, or combinations of both.

In method 514B, the processing of sensor signals may proceed as described above with reference to FIG. 6A with respect to like numbered blocks, in addition to which the processor may determine an appropriate weight to apply to received sensor input signals depending upon a variety of factors at block 652. For example, at block 652, the processor may assign one or more weighting factors to be applied to received sensor input signals based upon a current operation mode, a currently active application, a previously implemented function or command, a recognized state (e.g., being held by a user), a sensor reading (e.g., a temperature or accelerometer reading that may indicate that the mobile device is being held by the user), and combinations thereof. Such a weighting factor may be a numerical value that may be multiplied or added to a sensor input value in a manner consistent with the calculation or algorithm used to calculate a correlation value at block 658. The single weighting factor (or factors) may be applying to the received sensor signal values at block 654, such as by multiplying or adding the factor to the received signal value.

Similarly, in method 514B, the processor may determine a weighting factor that should be applied to a reference signal at block 656 the depending upon a variety of factors depending upon current operating modes, circumstances or previous operations. Such factors may include a currently active application, a current operation mode, a previous previously implemented function or command, a recognized state, a sensor reading, and combinations thereof. For example, at block 656, the processor may assign a weighting factor greater than 1.0 to those reference signals which correspond to functions that are relevant to an application currently operating on the mobile device. Thus, when a camera application is active, those reference signals corresponding to user input commands relevant to the camera application (e.g., shutter and zoom control) may be given a higher weighting factor than reference signals corresponding to user input commands relevant to another application or device operations. For example, once a user input gesture is recognized and executed activating a camera application, reference signals associated with camera function input gestures may be given increased weight and subsequent sensor signals may be assigned a higher weight in order to increase the probability that a camera function activation gesture will be recognized. As another example, a first user input gesture may be recognized as a prefix gesture in response to which the processor may assign a higher weighting factor to those reference signals corresponding to user input commands relating to, or only relevant in the context of, the prefix gesture, much like how the "alt," "ctrl" and/or function keys on a conventional keyboard can assign an alternative meaning to a subsequent key press. Thus, a five finger squeeze gesture may function as a prefix for user input gestures featuring a swipe movement or sequence of taps. Such a prefix gesture may be used to enable gestures that might otherwise be confused with normal handling of the mobile device. By implementing such application-specific, prefix-specific, or condition-specific weighting factors with reference signals, the processor may be able to correctly correlate a set of signals received from one or more force sensors which would otherwise exhibit nearly equal correlation values for multiple reference signals.

At block 658, the processor may calculate a weighted cross-correlation of the weighted input signal portion and the weighted reference signal to determine the correlation value to be used in determining whether the signals are associated with an intended user input gesture. The manner in which the weighted cross-correlation is calculated will depend upon the particular type of correlation algorithm implemented. Thus, at block 658, the signal-to-reference correlation value that is calculated may be enhanced or decreased based upon weighting factors applied to the received input signal, the reference signal being evaluated, or both. Such a weighted cross-correlation value may then be used to determine the reference signal with the highest correlation to the received input signal at block 624 as described above with reference to FIG. 6A.

Figure 13:
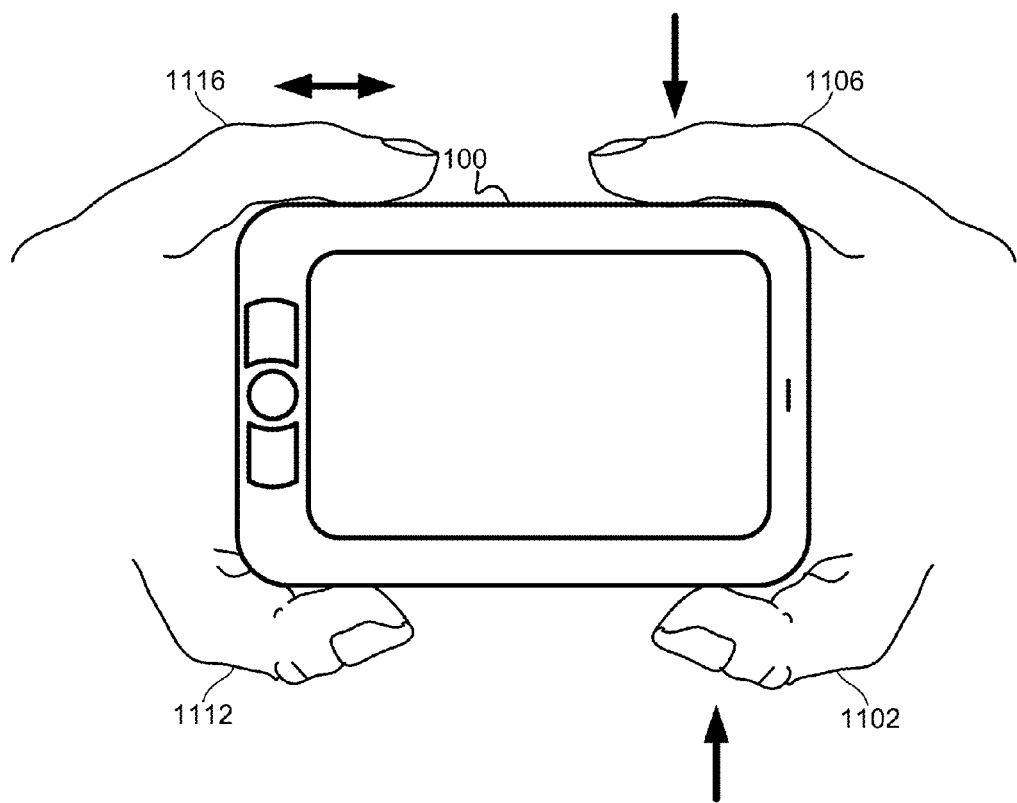
FIG. 13 is an illustration of another one-handed touch gesture suitable for use with the various aspects.

The assignment of weighting factors to received input signals and/or reference signals may also be accomplished on a per-sensor basis, so that those force sensors positioned on the mobile device that would be expected to receive a particular user input gesture may be given greater weight than signals from other sensors on the mobile device. For example, if a camera application is active, those force sensors positioned on the mobile device in locations where a user's fingers are expected when taking a photograph (such as illustrated in FIG. 13) may be assigned a higher weighting factor than signals from sensors positioned in other locations on the device case.

In this aspect, predefined reference signals may be assigned weighting factors based upon the associated functionality or upon the nature of the input gesture itself. For example input gestures associated with functionality which, if falsely activated, would have little impact on the user experience, may be assigned to a higher weighting factor since the mobile device can accommodate a higher false positive correlation rate for such gestures. As another example, some user input gestures may be associated with critical functionality such that when there is sufficient correlation to that gesture it is selected above other potential correlating gestures. Some user input gestures may also be assigned a higher weighting factor if the nature of the gesture is unique such that inadvertent activation is very unlikely. For example, if the input gesture involves a number of repetitions and simultaneous inputs on multiple services (e.g. a sequence of three squeeze gestures within a two second period), such a gesture may be given a greater weighting factor so that it is preferentially selected over other potential correlations. Thus, the more unique the input gesture, the higher the weighting factor that may be applied.

In this aspect, the received sensor input signal may also be assigned weighting factors depending upon a user setting or functionality selection (e.g., putting the device into a squeeze gesture input mode), other sensor data, the total RMS energy level of the input signal, or previously received, recognized and processed input gestures. In an aspect, a user may activate an operational mode for receiving user input gestures, such as by pressing a button, selecting a menu option, or manipulating the mobile device in a recognizable manner (e.g., shaking, squeezing and holding, etc.). In this mode, the sensor signals may be given a higher weighting factor since the user has indicated an intent to perform a user input gesture. In an aspect, information received from accelerometer, temperature, end location (e.g., GPS receiver) sensors may be evaluated to determine whether a current surface force sensor input should be given a higher weighting factor. As an example of another-sensor-data initiated weighting factor, if a device accelerometer signal indicates that the mobile device is oriented horizontally, the sensor input signal may be given greater weight since it may be presumed that the user is likely to use as an input gesture for taking a picture or sorting visual media. As another example, the nature of measured accelerations and/or a surface temperature measurement (which, as described below, may be determined from the piezo sensors themselves) may be analyzed to recognize when the mobile device is being held in the hand of the user, and thus a user input gesture is to be expected. The mobile device may be configured to recognize that it is being held by comparing the sensor signals to predefined reference signal patterns stored in memory (e.g., a level of random noise and signals combined with a voltage bias associated with a temperature rise). In an aspect, a previous function execution may prompt assigning a greater weight to a subsequent sensor input signal, such as to receive a sequence of user input gestures. For example, after a user input gesture has put the mobile device in a user input mode, sensor signals may be given a higher weighting factor. As another example, some recognized and executed functions will indicate that a subsequent user input gesture is likely, and thus subsequent sensor signal should be given a higher weighting value. For example, as discussed above, a user input gesture which activates a camera application may also prompt subsequent sensor signals to be assigned a higher weight to increased the probability that a camera function activation gesture will be recognized.

In another aspect illustrated in FIG. 7, the received sensor input signal may be cross correlated to a frequency-domain reference to recognize a user input gesture and identify the corresponding functionality. In method 514C at block 602, the mobile device processor may normalize the received signal, and at block 604, identify a portion of the input signal to be analyzed, using methods similar to those described above with reference to FIGS. 6A and 6B for like number blocks. At block 608, the input signal portion may be downsampled and stored in memory, such as a sampling buffer, or the full-bandwidth signal may be stored in memory, such as a sampling buffer. In method 514C at block 702, the processor may perform a fast Fourier transform (FFT) on the stored input signal, such as an n-point FFT process, to transform the signal into frequency-domain data which may be stored in memory. In block 702, the processor may use zero padding and a larger number n of samples for a higher resolution input system. The FFT transform processing block 702 may utilize a Hamming window, a Blackman-Harris window, a rectangular window, other sampling window, or a combination these different windows. Alternatively, at block 702 the processor may calculate an average of multiple FFT transformations with shifting sampling windows to provide a representation of the average frequency content of a waveform within the received sensor input signal.

With the frequency-domain signal data stored in memory, the frequency patterns in the signal may be compared to each reference signal in the reference signal database. In an aspect, this comparison may be performed in an iterative manner as illustrated in FIG. 7. Thus, at block 612, the processor may access a reference signal pattern stored in memory corresponding to a first predefined user input gesture. At block 706, the processor compares the stored input signal frequency-domain data to a pre-recorded frequency pattern, such as by employing well known statistical analysis techniques, to determine a degree of similarity or correlation value. As part of block 706, the calculated similarity or correlation value may be stored in a buffer along with the corresponding input gesture to enable the processor to determine a best match among all of the prerecorded frequency patterns. The similarity or correlation value may also be compared to a threshold value so that only those frequency patterns that closely match the input signal are considered further. At determination block 620, the processor may determine if there is another reference signal stored in memory for comparison. If so (i.e., determination block 620="Yes"), the processor may access the next reference signal at block 612 and calculate another similarity or correlation value at block 706. Once the input signal frequency-domain data have been compared to all of the stored reference signals (i.e., determination block 620="No"), the processor may determine the reference signal with the highest similarity or correlation value, and thus best matching the received input signal, at block 624. At determination block 628, the processor may determine whether the best calculated similarity or correlation value is sufficiently high to justify returning a match at block 632. This determination helps to reduce the frequency of false positive correlations which could be annoying to users if random handling of their mobile device frequently generated a function response not intended by the user. If the similarity or correlation value insufficiently high (i.e., determination block 628="Yes"), the processor may return an identifier of the correlated input gesture to a window manager or an application at block 632. If not (i.e., determination block 628="No"), the processor may return a no match indication or simply ignore the sensor input at block 638.

Similar to the processing of time-domain signals as described above with reference to FIG. 6A, the highest correlation value determination at block 624 and/or the determination of a sufficiently high correlation at determination block 628 may be accomplished using weighted input signal data and/or weighted reference signals in order to better correlate sensor data to intended user input gestures.

In another aspect, the processing at block 514 of FIG. 5 may be accomplished using a hidden Markov process. The hidden Markov model is a well known statistical model in which a system is modeled assuming that it involves a Markov process with an unobserved state, in this case the input signal that would be received from the intended user input gesture. Implementation of a hidden Markov process may be enabled by developing a reference signal database through supervised learning of sensor signals during training routines. Such a user-trained reference signal database may then be used to derive the maximum likelihood of an intended user input gesture given a recorded sensor output using a hidden Markov process. Such a user training process for generating a reference database is described below with reference to FIG. 9.

Figure 8:
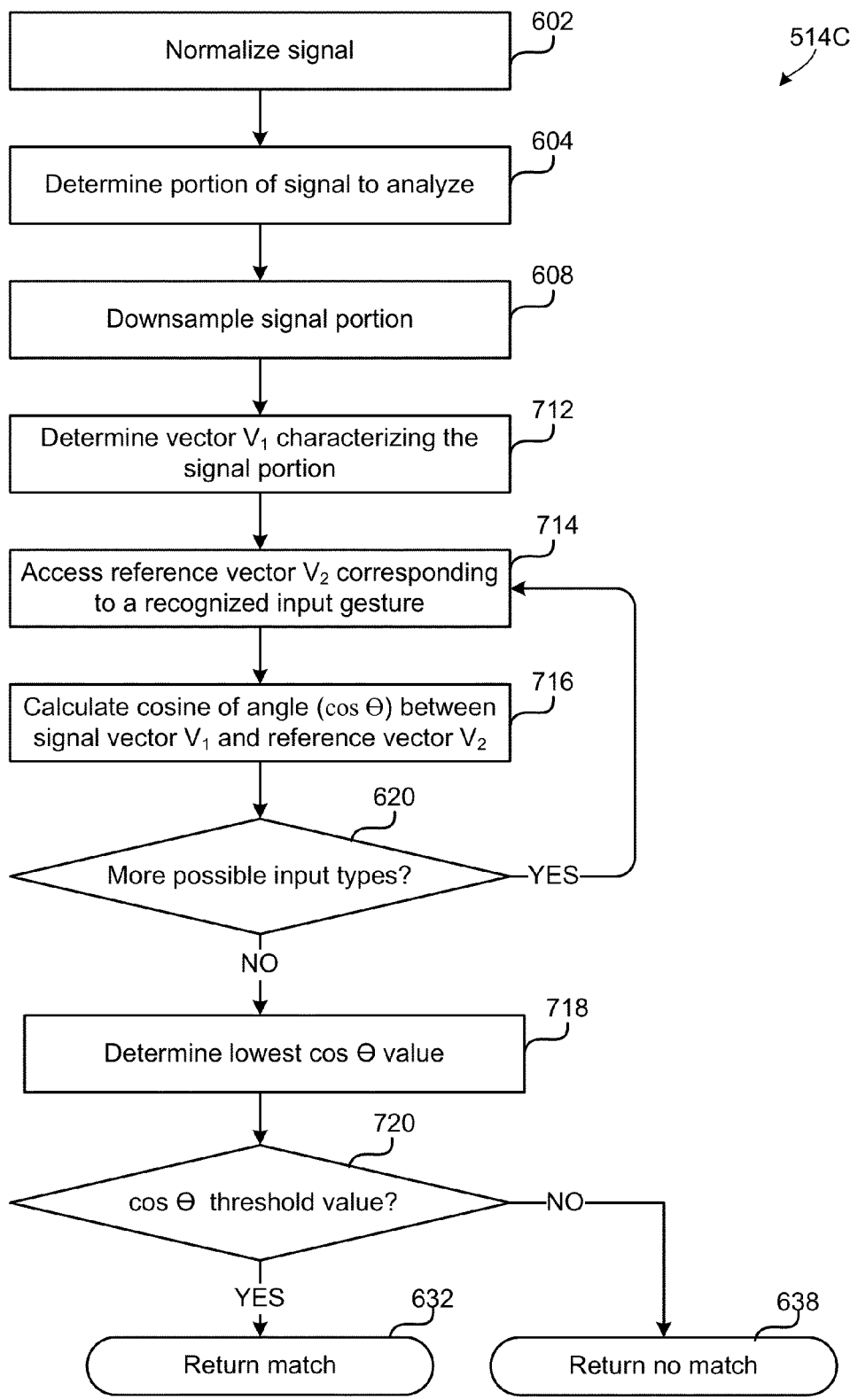
FIG. 8 is a process flow diagram of an aspect method for implementing gesture functionality on mobile devices equipped with force sensitive membranes using vector angle correlation algorithms.

In a further aspect illustrated in FIG. 8, the processing at block 514 of FIG. 5 may be accomplished using a vector space model method. The vector space model is a well known algebraic model for representing data objects as vectors of identifiers, and calculating a measure of similarity or correlation between two data objects based upon the angle between the sectors characterizing the two data objects. In practice, it is easier to calculate the cosine of the angle between the vectors instead the angle itself, so the method may calculate $\cos \Theta = (V_1 * V_2)/(\|V_1\| * \|V_2\|)$ where $V_1$ may be the vector characterizing the received sensor signal and $V_2$ may be the vector characterizing the reference signal. The vector space model may be applied to the entire waveform or selected portions of the waveform, such as time slice samples of the waveform to generate a series of $\cos \Theta$ calculations which may be averaged or otherwise used to determine an overall match. Further, the vector space model may be applied to time-domain data to frequency-domain data, and to both time- and frequency-domain data. Referring to FIG. 8, in method 514C at block 602, the mobile device processor may normalize the received signal, and at block 604, identify a portion of the input signal to be analyzed, using methods similar to those described above with reference to FIGS. 6A and 6B for like number blocks. At block 608, the input sensor signal portion may be downsampled and stored in memory, such as a sampling buffer, or the full-bandwidth signal may be stored in memory, such as a sampling buffer. At block 712, the processor may determine a vector $V_1$ or vectors characterizing the received sensor signal for example, the received sensor signal may be characterized in terms of direct or elements defined by RMS values at particular frequencies in the frequency domain, or RMS values at particular time slices in the time domain.

With the signal vector $V_1$ determine, cosine of the angle between the signal vector and each reference signal vector in a reference signal vector the database may be calculated. In an aspect, this calculation may be performed in an iterative manner as illustrated in FIG. 8. Thus, at block 714, the processor may access a reference signal vector stored in memory corresponding to a first predefined user input gesture. At block 716, the processor calculates the cosine of the angle ($\cos \Theta$) between the signal vector $V_1$ and the reference vector $V_2$. As part of block 716, the calculated cosine value may be stored in a buffer along with the corresponding input gesture to enable the processor to determine a best match among all of the prerecorded single vectors. Also as part of block 716, the cosine value may be compared to a threshold value so that only those signal vectors that closely match the input signal are considered further. According to the vector space model, a cosine value close to zero means the vectors match, and thus there is a good correlation between the input and reference signals, while a cosine value close to one being the vectors do not match. Thus, as part of block 716, only those cosine values less than a threshold (e.g., less than or equal to 0.5) will be stored in a buffer for determining a best match. At determination block 620, the processor may determine if there is another reference vector stored in memory for comparison. If so (i.e., determination block 620="Yes"), the processor may access the next reference signal at block 714 and calculate another cosine value at block 716. Once the input signal vector has been compared to all of the stored reference vectors (i.e., determination block 620="No"), the processor may determine the reference signal vector that results in the lowest cosine value, and thus represents a best match between with received input signal, at block 718. At determination block 720, the processor may determine whether the lowest cosine value is sufficiently low enough to justify returning a match at block 632. This determination helps to reduce the frequency of false positive correlations which could be annoying to users if random handling of their mobile device frequently generated a function response not intended by the user. If the best cosine value insufficiently low (i.e., determination block 720="Yes"), the processor may return an identifier of the correlated input gesture to a window manager or an application at block 632. If not (i.e., determination block 720="No"), the processor may return a no match indication or simply ignore the sensor input at block 638.

Similar to the processing of time-domain and frequency-domain signals as described above with reference to FIGS. 6 and 7, the lowest cosine value determination in block 718 and/or the determination of a sufficiently low cosine value in determination block 720 may be accomplished using weighted input signal data and/or weighted reference signal vectors in order to better correlate sensor data to intended user input gestures.

As discussed above, the reference signal database may be populated in whole or in part by the user performing a series of training operations in order to determine the normal signal response from the user performing particular input gestures on the user's mobile device. Such individual training ensures that the unique patterns of force applied by the individual's fingers and the sensor characteristics of the mobile device are accurately reflected in the reference database. For example, users will have different sized fingers and different hand strength, and thus will be applied different forces to the surface of the mobile device while performing particular input gestures. Also, the specific signal generated by force sensors on the case and the mobile device will depend upon the characteristics of the sensors and the case. To accommodate such variability, an aspect provides for user training of input gestures.

Figure 9:
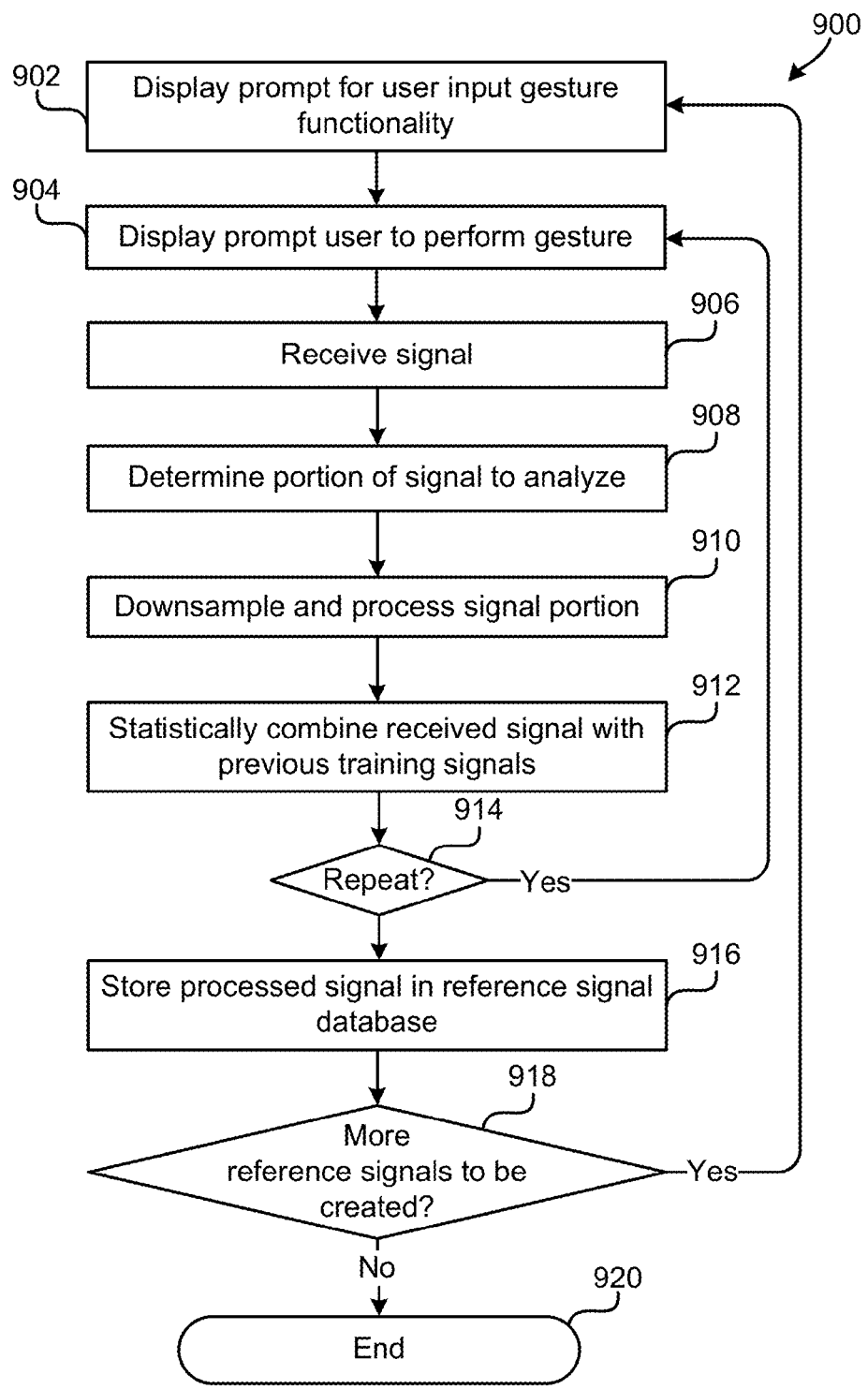
FIG. 9 is a process flow diagram of an aspect method for generating reference signal templates by training user input gestures.

FIG. 9 illustrates an example method 900 which may be used for populating a reference signal database through user training routines. In method 900 at block 902, the mobile device may display a prompt inviting the user to input a particular functionality to be associated with a particular input gesture. For example, the display could ask the user to press a button or make a menu selection indicating the function that the user would like to have accomplished when the input gesture is detected. At block 904, the mobile device may display a prompt inviting the user to execute the input gesture. At block 906 the mobile device begins monitoring piezo sensors in order to record the signals received when the user accomplishes be indicated gesture. At block 908, the mobile device may monitor the signals received from piezo sensors to determine when the user input gesture is beginning. This detection of the beginning of a user input gesture may utilize the methods described above with respect to block 604 in FIGS. 6A and 6B, such as detecting when the sensor departs dramatically from the running average RMS signal received from each sensor. At block 910, the mobile device may process the received signal so as to receive the data in a format appropriate for saving as a reference signal. For example, in implementations which will down sample piezo sensor signals, the signals received from the piezo sensors during the training routine may be down sampled in the same manner. Additionally, the received signals may be normalized, filtered, and otherwise processed in the same manner that would be accomplished for detecting user input gestures after training For implementations which analyze piezo sensor signals in the frequency domain, the processing at block 910 may include accomplishing an FFT on the signals to convert them into frequency-domain data. The processing of piezo sensor signals at block 910 may continue until the input gesture appears to have completed, such as by the signal returning to the level exhibited prior to the start of the gesture. As part of the processing at block 910, the processed signal waveform and/or frequency data may be stored in a buffer.

At block 912, the processed and stored signal waveform or frequency data may be statistically combined with previously stored signal waveforms or frequency data for the same input gesture in order to generate an average or statistically representative signal waveform or frequency data. This averaging processing enables the training routine to accommodate the natural variability in human movements and gestures in order to generate a reference signal waveform or frequency data that is representative of an average or most probable pattern. The results of the statistical combination may then be stored in temporary memory as part of block 912. At determination block 914, the mobile device may determine whether the training of the particular input gesture should be repeated, such as by counting the number of times the gesture has been performed. If the gesture should be repeated (i.e., determination block 914="Yes"), the mobile device may return to block 900 for two again display a prompt inviting user to perform the input gesture. Once sufficient repetitions of the flick gesture have been performed (i.e., determination block 914="No"), the final statistical combination of signals from the multiple training repetitions may be stored in the reference signal database linked to the functionality indicated for the gesture by the user at block 916. Thus, such a reference signal database may include data records having a function identifier or a pointer to a function call and one or more data records storing the averaged sensor signal waveform and/or frequency data. At determination block 918, the mobile device may determine whether more reference signals should be created. For example, the mobile device may display a prompt to the user inquiring whether the user would like to define another input gesture. As another example, the mobile device may be configured by a factory with a number of predefined input gestures which require personalizing training, in which case determination block 918 may involve determining whether an additional factory defined gesture remains to be trained. If another input gesture is to be defined and trained (i.e., determination block 918="Yes"), the mobile device may return to block 902 to display a prompt inviting user to identify the functionality to be associated with the next input gesture. Once all of the input gestures have been defined and trained (i.e., determination block 918="No"), the gesture definition and training routine may end at block 920.

It should be appreciated that the training method 900, the order in which a user may define the functionality to be linked to a gesture and perform the gesture in a training loop may be different from that described above. For example, a user may complete the training of an input gesture and then identify the function that should be associated with it. Additionally, the training method 900 may include steps for defining multiple functionalities for a particular gesture depending upon the application running on the mobile device, inputs received from other sensors (e.g., accelerometers), device operating states, and previously processed user input gestures. All of these may be defined in configured in the user training routine.

Figure 10A:
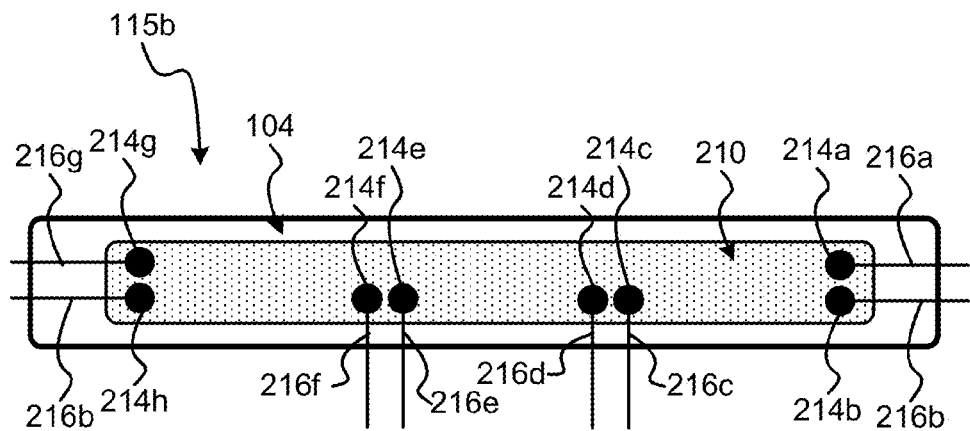
FIGS. 10A and 10B are component block diagrams of alternative configurations for pressure sensitive membranes suitable for use with the various aspects.
Figure 10B:
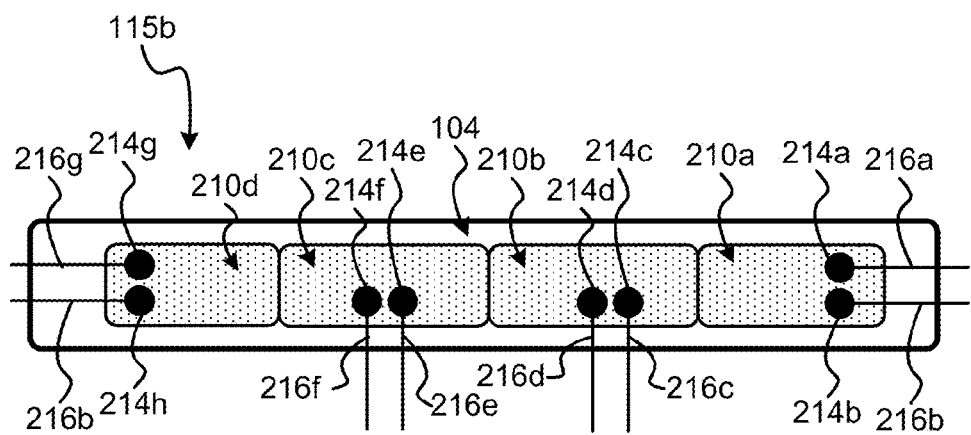

In various aspects, force sensitive membranes (or similar sensors) may be configured in a manner that increases the sensitivity or position resolution of the sensors. More sensitive implementations may be referred to as higher resolution, as they may capture more precise location and force information. FIGS. 10A and 10B show higher resolution implementations of a force sensitive input strips 115b mounted on a mobile device case 104. FIG. 10A shows a single piezo strip 210 with multiple contact pairs 214a-h connected to leads 216a-f. FIG. 10B shows multiple piezo strips 210a-d, each with a pair of contacts 214a-h connected via leads 216a-f. Positioning multiple contact pairs on a single piezo strip may enable the strip to generate multiple input signals which may vary depending upon the location of applied force, thereby providing some information regarding the location on the strip where force is applied. Positioning multiple piezo strip sensors 210a-d on a surface of the case 104 can provide sensor signals which are localized to the area of the strips. Thus, the use of four piezo strips 210a-d on a side of a mobile device case 104 in the manner illustrated in FIG. 10B would enable separate input signals to be received from each of four fingers gripping the device. Multiple signals from piezo strips with multiple contacts or from multiple piezo strip sensors may be processed in parallel, or the signals may be buffered or multiplexed to enable sequential processing. In some implementations, each individual sensor output signal may be assigned a weighting factor before or after cross-correlation.

Figure 11:
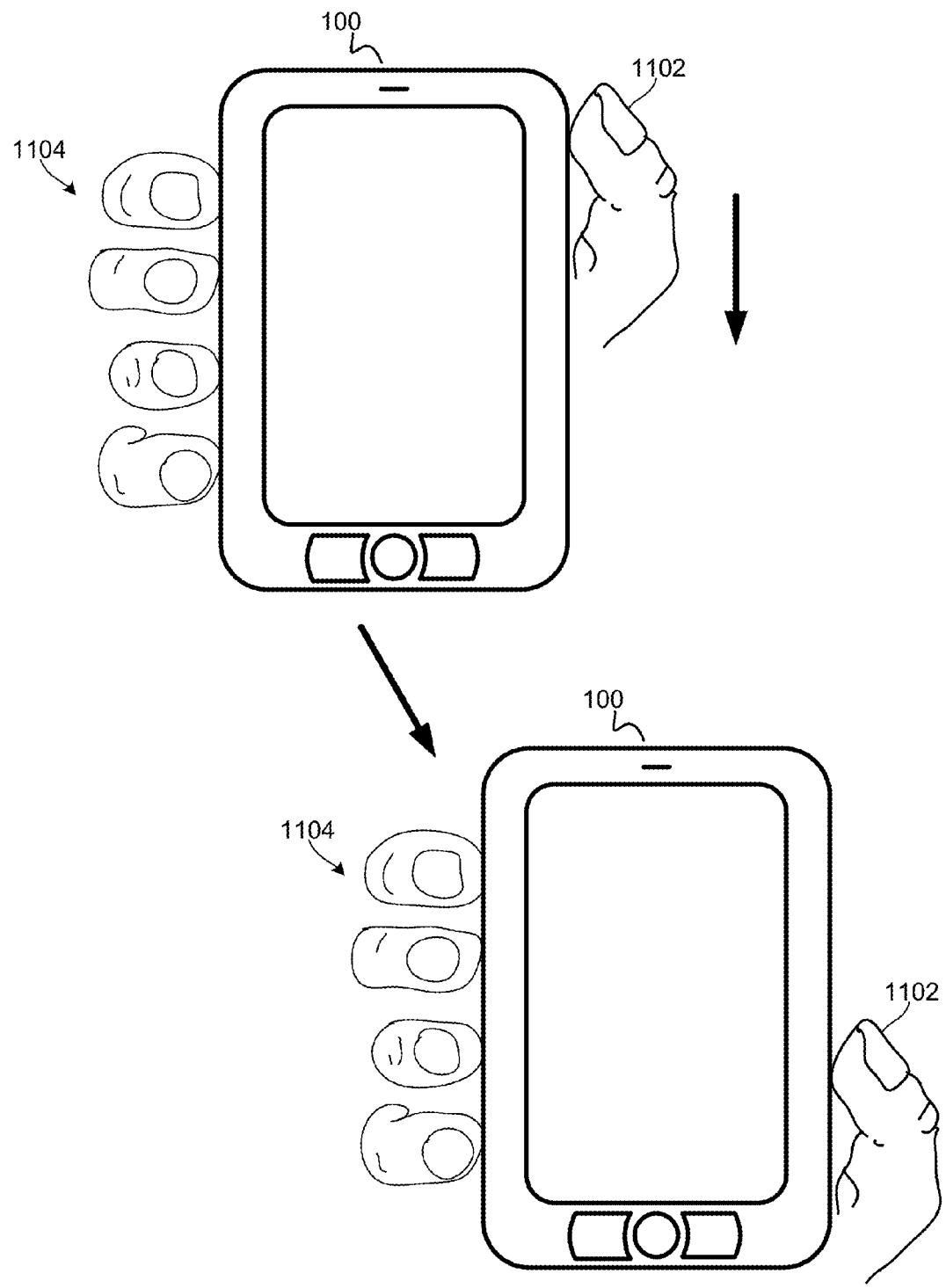
FIG. 11 is an illustration of a one-handed touch gesture suitable for use with the various aspects.

The various aspects described above enable a broad range of useful gestures for enabling user inputs that may be implemented in mobile devices. Of particular benefit may be the ability to interpret various one-handed gestures that can be implemented on a mobile device held in one hand in a convenient manner. An example of one such gesture is illustrated in FIG. 11 which shows a mobile device 100 being held in a user's right hand, squeezed between the thumb 1102 and fingertips 1104. This is a comfortable position for holding a mobile device 100, but the fingers 1104 are not available for touching keys or a touch surface. Thus, to touch the display screen or buttons would require the user to touch the device with the other hand. However, there are many circumstances in which users do not have a free hand for interfacing with the mobile device. For example, if a person is speaking on a cellular telephone while driving, one hand must remain on the steering wheel and users cannot safely divert their attention to look at a display screen or keypad to interface with the device using conventional user interface mechanisms. The various aspects provide a simple user interface gesture that can be executed by one hand holding the device without requiring the user to look at a display screen or keypad.

As illustrated in FIG. 11, one simple gesture that may be implemented on a mobile device equipped with a touch/force sensor on the peripheral edges (i.e., in locations on the mobile device 100 in contact with the thumb 1102 and fingers 1104), is to slide the thumb 1102 along one edge of the device. As discussed above, such a sliding or swiping gesture may be recognized based upon the signals produced by a touch/force sensor positioned on the side of the mobile device 100 so as to be contacted by the user's thumb 1102. Detection of such a slide or swipe event and the direction of the sliding movement may be interpreted as a user input gesture associated with a particular function or command for the mobile device. For example, detection of such a sliding or swiping movement may be interpreted as a command to change the volume when the mobile device is conducting a cellular telephone call. When a cellular telephone call is not in process, the detection of a thumb 1102 sliding on the side of the device may be interpreted as a user gesture to scroll through a phone directory, flip to a subsequent e-mail message, scroll through a calendar of scheduled events, change a channel or frequency for receiving radio or mobile television broadcasts, change a map display resolution, etc., all depending upon the application that is executing on the mobile device.

In the gesture illustrated in FIG. 11, the mobile device 100 may recognize the thumb sliding gesture as indicating one function when all four fingers 1104 are pressing against the opposite side the mobile device, and a different function when fewer than four fingers 1104 are contacting the opposite side of the mobile device case 104. In this aspect, a user may change the gesture to indicate a different command to be implemented by lifting one or more fingers 1104. Thus, a thumb sliding gesture with four fingers 1104 contacting the mobile device 100 may have a different meaning than a thumb sliding gesture when three fingers 1104 are touching the mobile device, which may be different from the meaning of a thumb sliding gesture when two fingers 1104 are touching the mobile device. Additionally, the force applied by the fingers 1104 may be measured and used as a way of distinguishing different commands associated with thumb sliding gestures. Thus, a thumb sliding gesture with light force from four fingers 1104 may have a different meaning than a thumb sliding gesture with heavy force applied by the four fingers 1104.

Figure 12:
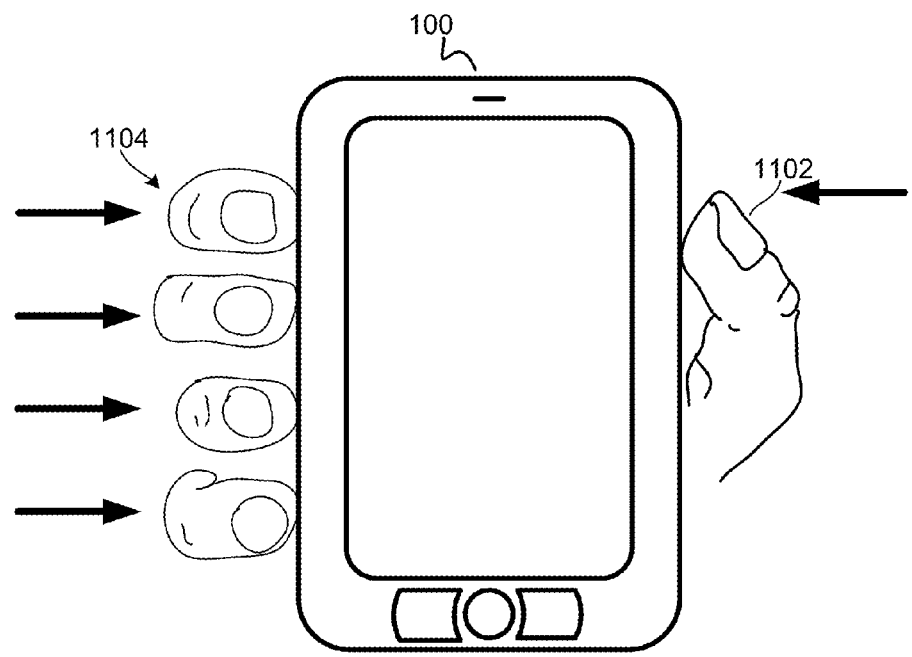
FIG. 12 is an illustration of another one-handed touch gesture suitable for use with the various aspects.

In a further example illustrated in FIG. 12, the relative force applied by the thumb 1102 and one or more of the fingers 1104 may be interpreted as a user input. For example, light force applied by the thumb 1102 and individual fingers method for may be distinguished from heavy force, such as based upon the magnitude and characteristic of the signal received from the touch/force sensing surface of the mobile device 100. In this aspect, the force applied by each digit and the various combinations of digits may be correlated to particular commands. Thus, heavy force by the thumb 1102 may be associated with a first command, heavy force by the thumb 1102 and a the index finger may be associated with the second command, heavy force by the thumb 1102 and the index finger and pinky finger may be associated with a third command, etc. In this manner, a number of user input gestures may be configured similar to how musicians interface with musical instruments, such as a trumpet or clarinet.

Another example of user input gestures based on touch/force measuring surfaces is illustrated in FIG. 13. In this example, the mobile device 100 is held in the landscape configuration between the thumb 1102 and index finger 1106 of the right hand and the thumb 1112 and index finger 1116 of the left-hand, as may be convenient when taking a photograph with a built-in digital camera. The mobile device 100 may be configured to recognize when the device is being held in this manner, such as based accelerometer data which indicates the device is in a horizontal orientation and detection of touches on the sides adjacent to each of the four corners. When such an orientation is recognized, the mobile device 100 may recognize varying force applied by fingertips and sliding force of the fingers 1106, 1116 and thumbs 1102, 1112 as user inputs gestures relevant to a camera application. For example, a sliding movement of the left index finger 1116 may be interpreted as a command to adjust the zoom applied to the image, while a squeezing force between the right-hand thumb 1102 and index finger 1116 may be interpreted as a command to take a photograph.

The example illustrated in FIG. 13 also serves to illustrate a further type of user input gesture in which the release of force is recognized as part of the gesture. For example, a user may be able to hold a mobile device steadier for taking a picture in a camera mode if the shutter activation is activated by a new release of finger pressure, rather than an application of force. This is because applying force to the case may inadvertently twist the mobile device slightly, thereby throwing off the aim of the photo. However, if a user focuses on the subject while applying force to the case, the mobile device is less likely to jiggle or move when the user releases pressure. In this aspect, a user gesture associated with the picture taking functionality may be accomplished in two steps. In a first step, the user may apply pressure to the case, such as by the right index finger similar to pressing a shutter switch on a conventional camera. Once the user has focused the device on a subject, the picture taking function can be initiated by releasing the pressure applied by the index finger. The mobile device may be configured to sense the change in input signal from the piezo sensor positioned beneath the index finger and correlate that sensor signal to the picture taking functionality.

The gesture illustrated in FIG. 13 is not limited to camera-related commands, and maybe interpreted differently when a different application is active on the mobile device 100. For example, if the mobile device is displaying an Internet webpage (i.e., the active application is a Web browser), sliding movements of the fingers 1106, 1116 may be interpreted as commands to move a cursor within the displayed image or to pan or zoom the image, while a squeezing force between the right-hand thumb 1102 and index finger 1106 may be interpreted as a command to click on a hyperlink within the displayed image. As another example, the sliding and squeezing gestures illustrated in FIG. 13 may be correlated to standard video control commands when the mobile device 100 is displaying a video, such as a stored video clip or movie, or a mobile television image. As a further example, moving the finger up and down on the side of the mobile device 100 could be interpreted as user input commands to scroll, pan, or zoom a displayed image when viewing a static digital photograph.

Figure 14A:
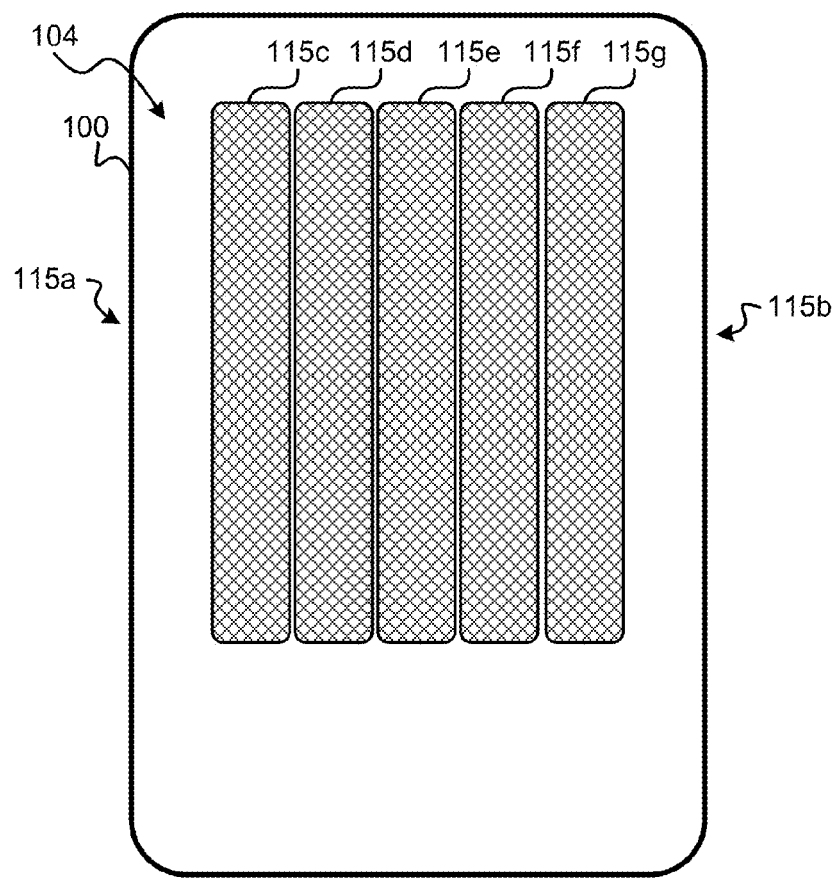
FIG. 14A is an illustration of pressure sensitive membranes implemented on a case of a mobile device suitable for use with the various aspects.

As illustrated in FIG. 14A, the use of touch/force sensors on mobile devices 100 may also be applied to the back case 104. For example, by deploying touch/force sensors 115a, 115b on the sides, and a number of such sensors 115c-115g on the back of the case 104, user gestures may also be enabled based upon touches on the backside of a mobile device 100. In this manner, the back case of a mobile device 100 may be converted into a form of touch sensor, similar to a touchpad on a laptop computer. Since a user holding a mobile device in one hand may apply a finger, such as the index finger, to the back of the case, users can tap or trace shapes on the back case which the mobile device 100 can then interpret as user input gestures. In this manner, a user may trace lines on the back of the case while viewing the traced lines presented on the display.

Figure 14B:
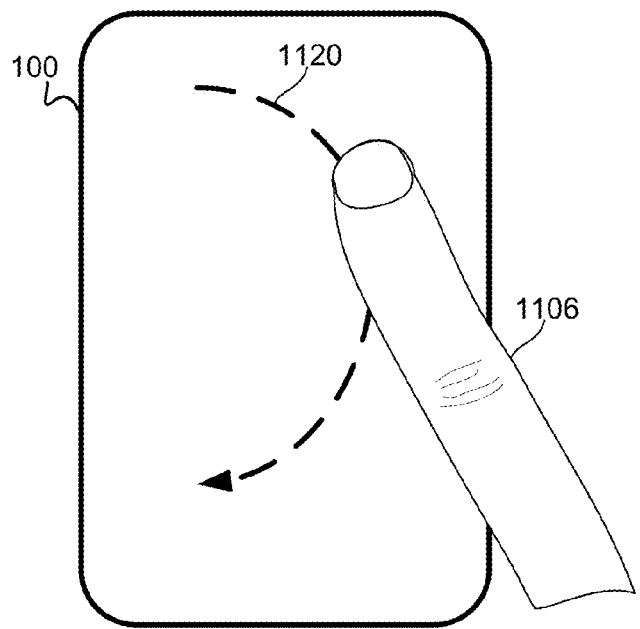
FIG. 14B is an illustration of a touch gesture suitable for use with a mobile device similar to that illustrated in FIG. 14A.

An example of a gesture that may be traced on the back of a mobile device 100 is illustrated in FIG. 14B. In this example, a user may command the mobile device 100 to execute a function by touching the back case with a finger, such as the index finger 1106, and tracing a recognizable path 1120. The mobile device 100 may be configured to detect and recognize the traced gesture using the methods described above, determine the user input command corresponding to the recognize gesture, such as based upon a currently active application, and implement the command just as if the user had press a function key or executed the gesture on a touchscreen display. Such gestures on the back case may be combined with gestures and forces applied to touch/force sensors on the side surfaces by other fingers to provide a wide range of distinctive user input command gestures that may be executed using the various aspects.

By positioning deploying touch/force sensors on multiple surfaces of a mobile device case, non-traditional user input gestures may be enabled by the ability to distinguish different types of user touches. For example, the sensors and the mobile device processor may be configured to recognize when a user is touching the device as if petting it. Such a user input gesture may be recognized in combination with accelerometer sensor readings as a command to enter a sleep or nighttime clock and alarm mode if the user pets the device while it is still, as on a night stand. As another example, the sensors and processor may be configured to recognize a scratch or tickling touch as a command to wake up from a sleep mode, or to activate a particular application.

A variety of different sensor sizes, numbers and locations on a mobile device case may be implemented to enable a variety of the user input gestures. For example, a low-cost implementation may include just two sensors each located on one side of the mobile device case 104. Such an implementation may enable the user input gestures described above with reference to FIGS. 11-13. A higher resolution implementation may implement multiple sensors on each of the long sides of the mobile device case, such as illustrated in FIG. 10B so that applied forces and taps by each fingers of one hand may be individually resolved. In a further implementation, one or more sensors may also be applied to the top and bottom sides of the case so that user input gestures may be accomplished on those sides as well. In a further implementation, multiple sensors may be applied to the top, bottom, sides and back of the case, so as to enable user input gestures to be accomplished on any surface of the mobile device. Additionally, the size and shape of the sensors may be varied in order to provide more or less positional resolution of squeeze, tap and swipe user input gestures. In a further aspect, piezo strip sensors may be positioned along the bezel surrounding the display screen of the device so that they may receive inputs that can correspond to virtual keys or functionality tabs image on the display adjacent to the bezel.

Figure 15A:
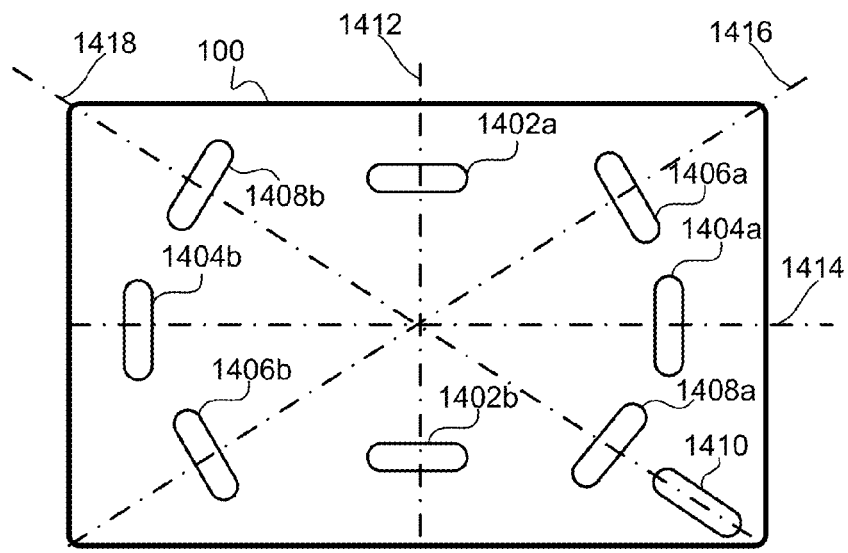
FIG. 15A is an illustration of positioning pressure sensitive membranes along bending axes of a mobile device according to an aspect.
Figure 15B:
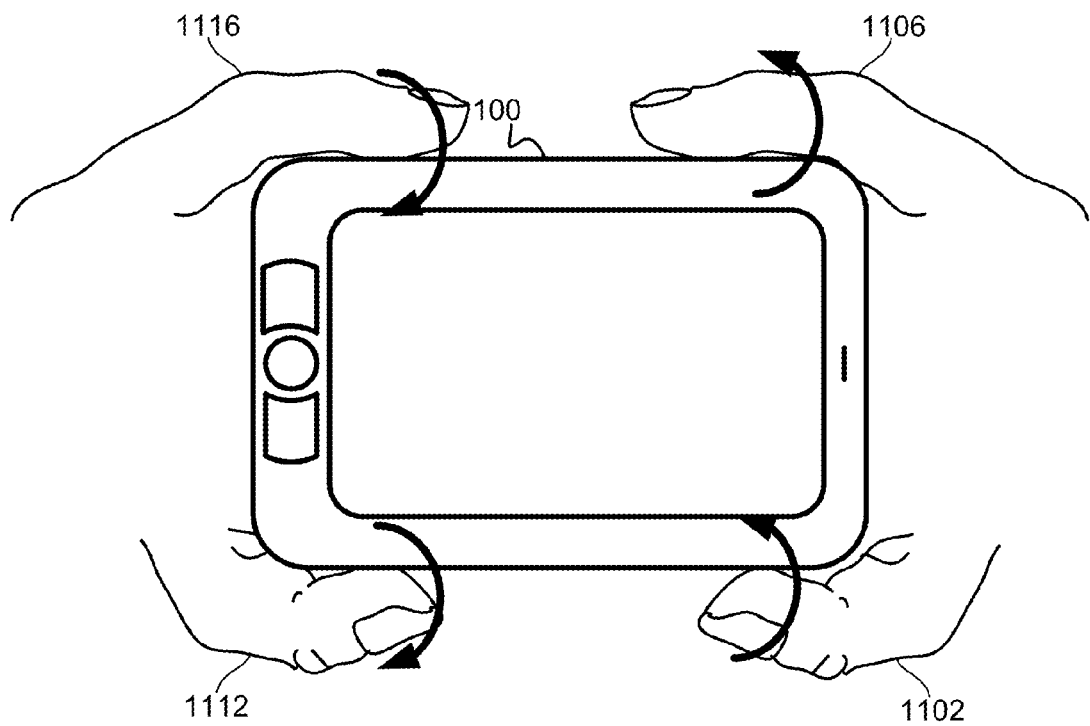
FIGS. 15B-15F are illustrations of touch gestures suitable for use with a mobile device similar to that illustrated in FIG. 15A.
Figure 15C:
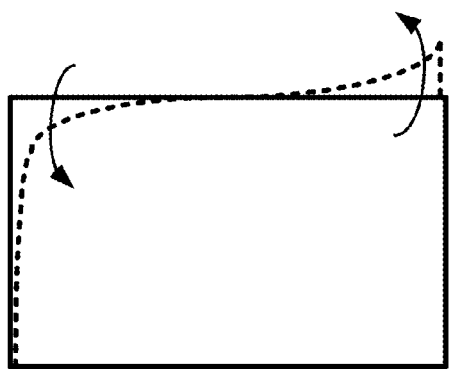

FIG. 15A illustrates another aspect in which piezo strips 1402a, 1402b, 1404a, 1404b, 1406a, 1406b, 1408a, 1408b may also be positioned on the mobile device case 104 across bending axes, such as the horizontal bending access 1412, vertical 1414, and the diagonal axes 1416, 1418. Piezo strips positioned in such locations can be configured to generate signals (e.g., due to bending strain) indicating a twisting or bending force applied to the mobile device. One user input gesture enabled by such a deployment of piezo strips as illustrated in FIGS. 15B and 15C. In this gesture, a user may apply twisting forces to the four corners of the mobile device (or table computing device) as shown in FIG. 15B so as to induce a twist in the device in one direction as illustrated in FIG. 15C. In most implementations the amount of twisting distortion induced in the case may be small, but detectable by the piezo strip sensors 1402a, 1402b, 1404a, 1404b, 1406a, 1406b, 1408a, 1408b. For example, a user input gesture in the form of a twist of the device may be associated with a scroll function (e.g., for a list or displayed image) where the direction of scrolling (up or down) depends upon the direction of the twisting motion.

Figure 15D:
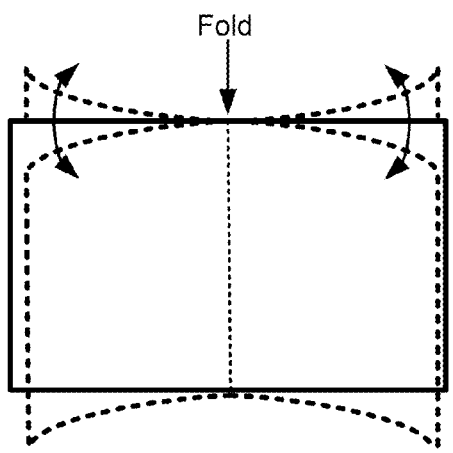
Figure 15E:
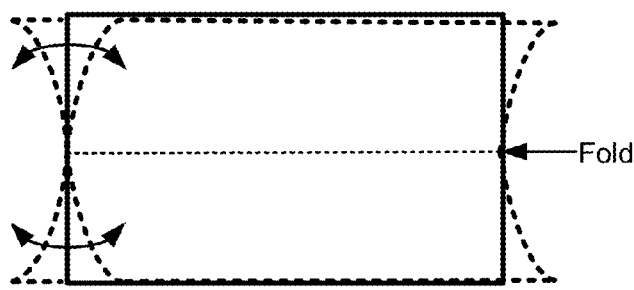
Figure 15F:
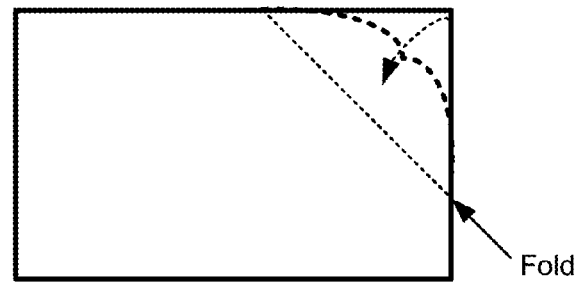

The deployment of piezo strips as shown in FIG. 15A would also enable user gestures involving a bending force apply along the long or short axes of the mobile device. Such user gestures are illustrated in FIGS. 15D and 15E. As a further example illustrated in FIG. 15F, the piezo strips 1406a, 1406b and 1408a, 1408b along diagonal axes 1416 and 1418, respectively, may be configured to generate signals in response to a bending force applied by a user to one corner of the case as if flexing a paperback book to flip through pages, or "thumbing" the upper right hand corner (for example), to flip through pages. In sensing bending input gestures, signals from a combination of sensors may be used to recognize the gestures, such as signals from sensors along a diagonal axis and both the horizontal and vertical axes. Further, additional piezo strip sensors may be positioned in optimal locations to enable particular gestures, such as a piezo strip 1410 positioned in an upper right hand corner of the mobile device case to sense a page flipping user input gesture as illustrated in FIG. 15F.

The piezo strip sensors and the circuits and methods that process their signals may be configured to distinguish bending user input gestures on a temporal basis (i.e., duration of the generated signal), as well as on the basis of the induced bending stress. For example, a rapid flex and release force (e.g., thumbing a corner of the device) may be recognized as one user input gesture, a relatively slow flex and release may be recognized as a second user input gesture, and a flex and hold force may be recognized as a third user input gesture. For example, a rapid application and release of the twisting force illustrated in FIGS. 15B and 15C might be interpreted as an activation command or step-wise scroll command, a relatively slow application and release of the twisting force illustrated in FIGS. 15B and 15C might be interpreted as a page-down scroll command, and a flex-and-hold application of twisting forces might be interpreted as a continuous scroll command.

The different bending directions that may be recognized with the piezo strip configurations illustrated in FIG. 15A in combination with temporal analysis of the applied forces provide a large number of different user input gestures that may be implemented. Such input gestures may be ascribed to application commands so the gestures are intuitively linked to the activated functionality. The twist to scroll through a displayed list and corner twist to flip through pages of a displayed text are just two illustrations of intuitive user input gestures enabled by the various aspects. Such user input gestures may be particularly useful in game applications where the physical forces applied in executing the gestures can be linked to game actions that are intuitively similar, perhaps enabling entirely new types of games and game interfaces.

One of the advantages of using piezoelectric material sensors as described herein is that the sensor membranes may be relatively large and are not sensitive to the location where force is applied. Thus, the placement of a user's fingers on the device case is not essential to the operation of the sensor. This enables users to accomplish input gestures without having to worry about the placement of fingers on the device, allowing the gestures to be made without requiring the user to look at the device. To the extent that such force sensors can distinguish the location of force, this capability may be used to enable the device to map button locations to the actual locations of fingers on the case. Both capabilities help to provide one-handed operation that does not require the user to look up the device.

In the various aspects, the location, force, duration and direction of tap and slide interactions with the touch/force sensing surfaces of the mobile device may be interpreted as different primitives that can be recognized and combined to correlate different user input commands. For example, multiple taps at different locations on the case and sides of the mobile device 100 may be distinguished as representing different user input gestures. Additionally, taps and sustained force may be interpreted as different commands when executed in different sequences. For example, a single tap followed by a sustained touch (i.e., a "touch and hold" gesture) may be interpreted as one user input gesture, while a double tap followed by a sustained touch (i.e., a "double tap and hold" gesture) may be interpreted as a different user input gesture. The location of the taps and the sustained touch his may also be factored into the interpretation of the user input gesture.

Similarly, the starting point, direction and speed of swipe movements may be interpreted as parameters that can be used to correlate the gestures to particular user input commands. For example, a very fast drag off one side might be interpreted as a flick gesture, similar to gestures that may be executed on a touchscreen display.

In addition to standard application user interface commands, various touch, squeeze, tap and swipe gestures may be applied to other functionality, such as a device lock that can only be unlocked using a particular touch, tap and swipe gesture designated by the user. For example, the user may configure the mobile device to remain locked until a particular sequence is applied, such as three taps and a squeeze. Since such gestures can be executed with one hand at the same time that the mobile device is picked up, such a device lock could be easy to implement, providing security for the mobile device without imposing upon the user experience.

A further capability enabled by the various aspects is enabled by the temperature response of piezoelectric materials that may be used in touch/force sensors. Many piezoelectric materials exhibit a thermal electric effect or exhibit changes in behavior based upon the temperature. Such temperature dependent responses may be used as a sensor input to enable a mobile device to detect when it has been picked up and is being held by a user. In general, detection of a temperature change consistent with the mobile device being held by a user may be used to initiate an operating mode such that the device behaves in a manner different than when it is at a lower temperature. For example, detection of a temperature rise consistent with being held by a user may prompt the mobile device to accelerate the processor in anticipation of receiving a user input command. As another example, detection of an increase in temperature consistent with the device being held by a user may prompt an increase in the weighting factors applied to piezo sensor signal inputs, since there is a greater probability that the user may soon accomplished a user input gesture. As another example, the mobile device may begin downloading a user's favorite webpages, downloading electronic mail or reconciling an e-mail inbox, or pulling down recent "tweets" from a Twitter site. A mobile device may be configured to recognize the when it is being held based upon temperature changes which will output a sensor signal in a manner very similar to that described above with reference to FIGS. 5-9.

In a further aspect, the mobile device may leverage other sensors in combination with the force and temperature sensing capabilities of piezo sensors to initiate actions, change operating modes or configurations, or otherwise adapt to the user's situation. For example, the temperature and force sensor readings from piezo sensors could be combined with accelerometer and/or ambient light sensors (e.g., a digital camera) to determine an appropriate operating mode or setting.

In a further aspect, the mobile device configured with piezo sensors may enable a "last call" functionality to being enabled when a battery voltage sensor indicates that the device battery is nearly out of power. In such a situation, activating the display screen to enable placing a telephone call could drain the remaining battery power. Using the various aspects, a user gesture may be programmed into the mobile device that enables it to place a telephone call in a minimal power operating state, such as without activating the display screen. For example, a particular phone number may be associated with a user defined input gesture and further configured so that when a very low battery state is detected the recognition of this user input gesture would prompt the mobile device to place a call to the predefined telephone number in a minimum power state. Thus, if a user attempts to place a call and realizes that the phone is out of battery power because the screen will not eliminate, the user may execute the predefined input gesture in order to place a last call, such as to a family member, before the battery is completely drained.

The various touch, squeeze, tap and swipe gestures described above may also be applied to macros in advanced applications, or linked to favorite features, such as particular personal preferences on a feature phone.

Figure 16A:
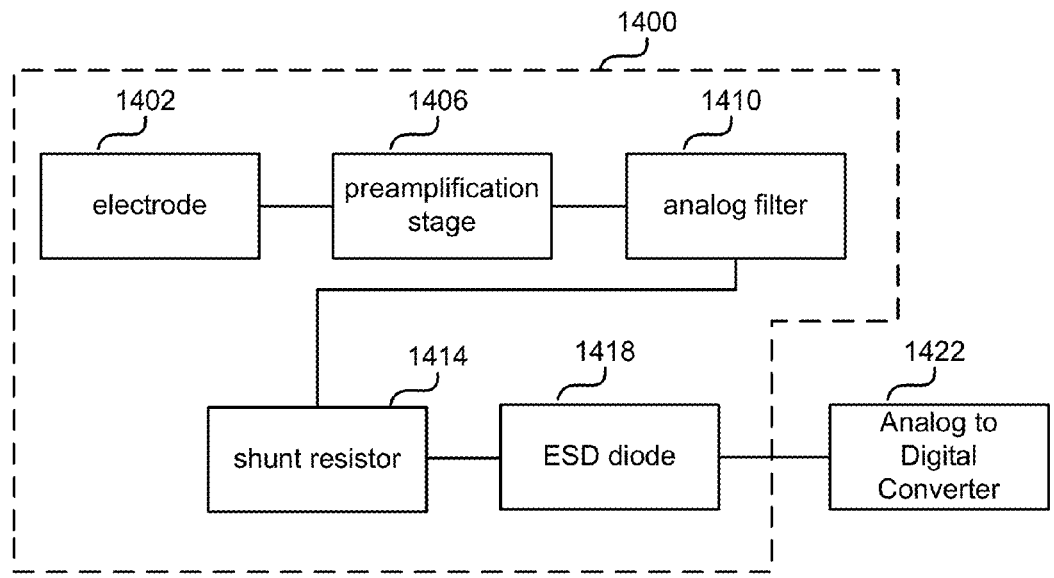
FIGS. 16A and 16B are system block diagrams of signal processing circuitry suitable for use with the various aspects
Figure 16B:
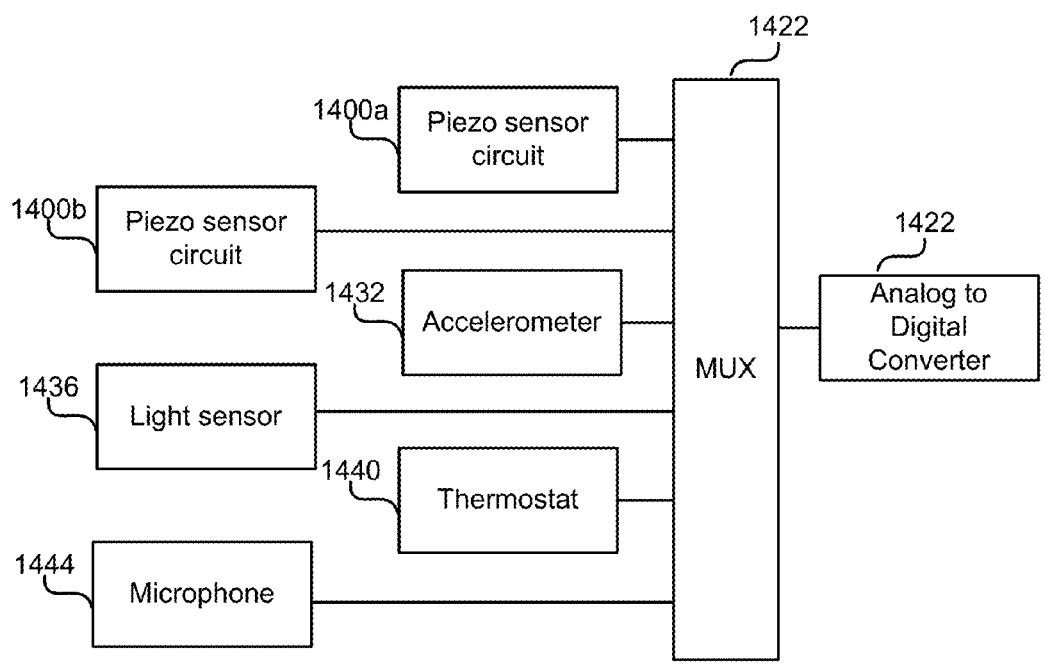

The various aspects of the invention may utilize signal processing circuitry to convert a raw voltage received from a piezoelectric material. An example of such a circuit is illustrated in the circuit block diagram shown in FIG. 16A. The voltage may be received at an electrode 1402 coupled to a piezo strip. The electrode 1402 may be connected, directly or indirectly, to an analog to digital converter 1422. In an aspect, the electrode may be coupled to a preamplification stage 1406 which is configured to amplify the sensor signal. The circuit may also include an analog filter 1410, such as to filter out low-frequency signals (e.g., 60-180 Hz), such as may be generated by power circuitry and common EMI emitters, and to filter out high-frequency signals that may be received from radio frequency sources. The circuit may also include a shunt resistor 1414 to provide a high-pass filter effect and prevent saturation of the analog to digital converter 1422 from high voltage spikes. The circuit may also include an ESD diode 1418 to prevent large voltages from damaging the circuitry. A dangerously large voltage may be caused by, for example, when a dropped mobile device strikes the ground directly on the piezo strip. The electrode 1402 and other circuitry may be assembled together in a single package as a piezo sensor circuit 1400. Multiple piezo sensor circuits may share a single analog to digital converter. An example of such an arrangement is illustrated in FIG. 16B. In this example implementation, one or more piezo sensor circuits 1400*a-b* may be couple to a single analog to digital converter 1422 via a multiplexer 1422. Further, the piezo sensor circuits 1400*a-b* may also share the analog to digital converter 1422 with other sensors and input devices such as an accelerometer 1432, a light sensor 1436, a thermostat 1440 and a microphone 1444.

The sensor signal processing of the various aspects may be accomplished using a variety of known processor circuits. In one aspect, the processing power of a central processing unit for the mobile device is used to perform the signal comparisons to the reference signal database. In another aspect, a digital signal processor (DSP) may be used to perform the signal comparisons of the various methods. Such a DSP may be a DSP dedicated to the piezo sensor processing. Alternatively, a DSP within a communication modem of the mobile device may be used to process the piezo sensor signals on a time-sharing basis.

Figure 17:
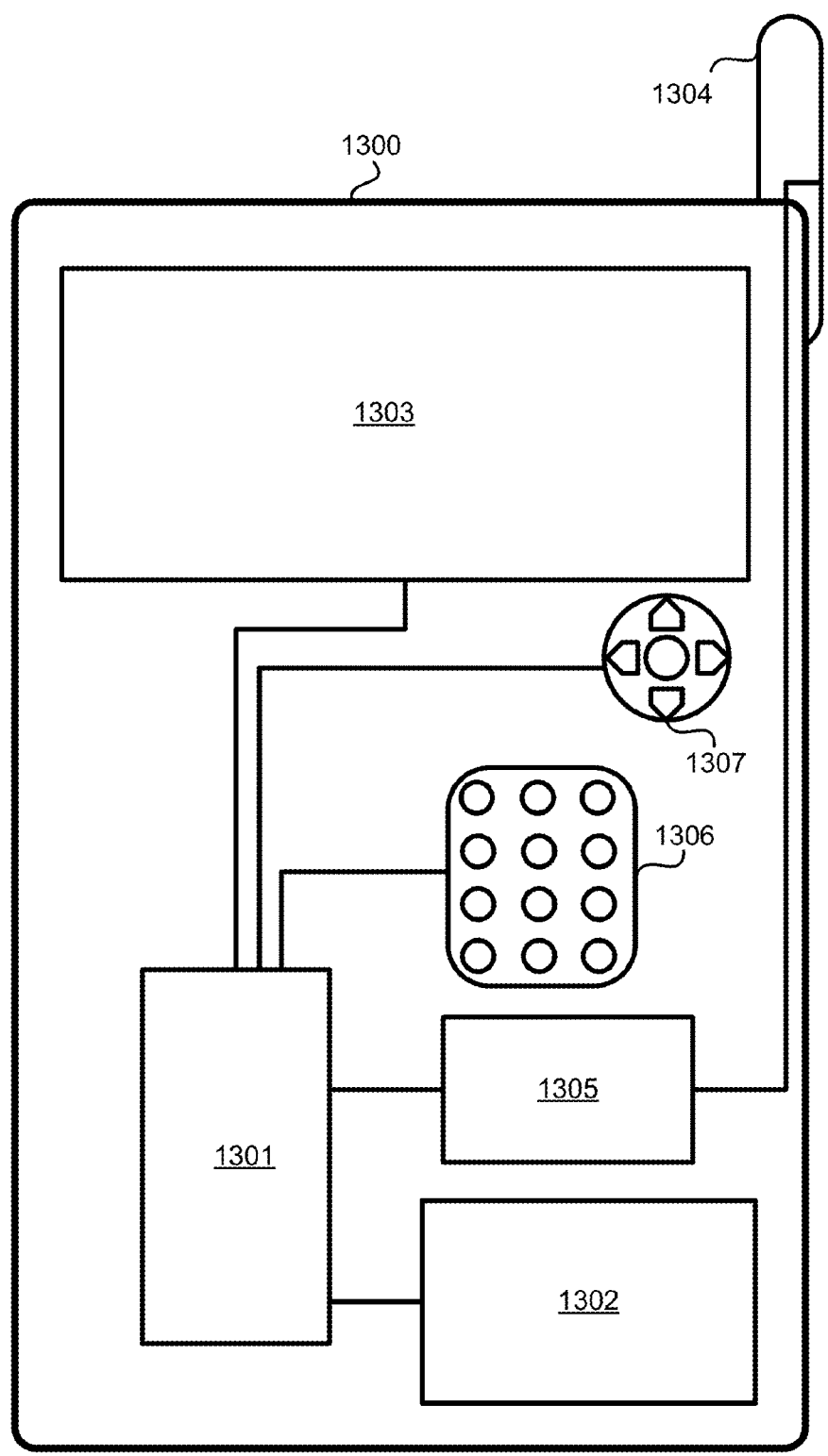
FIG. 17 is a component block diagram of an example mobile device suitable for use with the various aspects.

Typical mobile devices suitable for use with the various aspects will have in common the components illustrated in FIG. 17. For example, the exemplary mobile device 1300 may include a processor 1301 coupled to internal memory 1302, a display 1303 and to a SIM or similar removable memory unit. Additionally, the mobile device 1300 may have an antenna 1304 for sending and receiving electromagnetic radiation that is connected to a wireless data link and/or cellular telephone transceiver 1305 coupled to the processor 1301. In some implementations, the transceiver 1305 and portions of the processor 1301 and memory 1302 used for cellular telephone communications are collectively referred to as the air interface since it provides a data interface via a wireless data link. Mobile devices typically also include a key pad 1306 or miniature keyboard and menu selection buttons or rocker switches 1307 for receiving user inputs.

Figure 18:
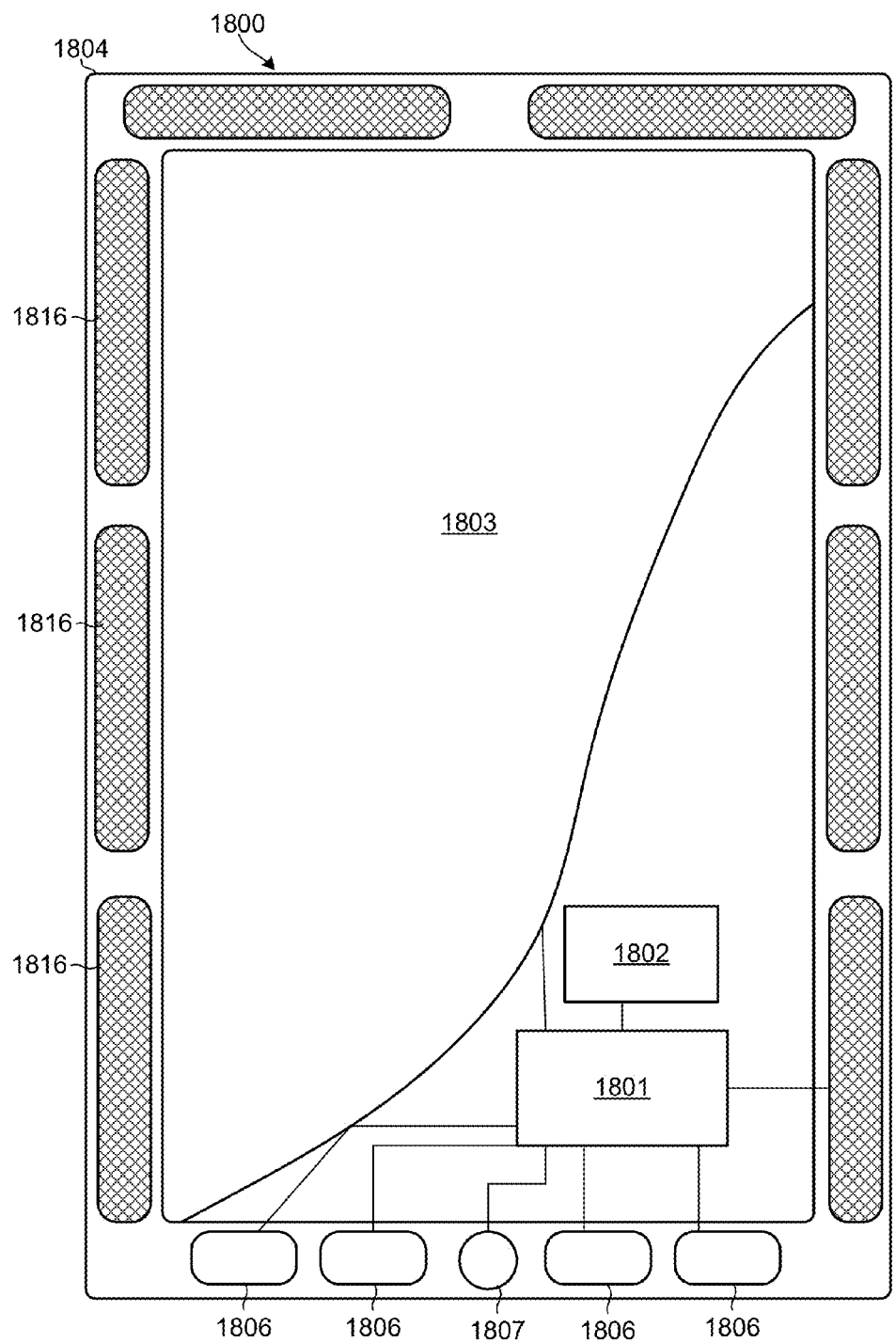
FIG. 18 is a component block diagram of an example tablet computing device suitable for use with the various aspects.

The various aspects are not limited to mobile devices, although such devices provide real benefit would benefit from implementation of the various aspects. Other computing devices may also be equipped with force sensing membrane sensors to accomplish similar to enable similar user input gesture control. An example of such a device is illustrated in FIG. 18 which shows a tablet computer 1800. Such a tablet 1800 computing device may feature a large display 1803 included within a case 1804 that features very few user interface devices in order to maximize the display area. The computing device 1800 may be controlled by a processor 1801 coupled to memory 1802. Such a tablet computing device 1800 may include a touchscreen display 1803 as the primary user input device. The use of force sensing sensors, such as piezo sensors 1816 about the periphery of the front side, as well as the sides, top, bottom and back portions of the case 1804 may enable the tablet 1800 to be controlled by user input gestures similar to those described above using the various aspect methods. Additionally, the tablet 1800 may include user interface buttons 1806 and a trackball input 1807 coupled to a processor 1801.

The various aspects enable user input gestures on a tablet computer device 1800 that can be accomplished while both hands are holding the device. For example, user input gestures can be accomplished by applying squeezing, twisting, bending or pressure forces to the sides and back of the device case using both hands.

The processor 1301, 1801 used in computing devices implementing the various aspects may be any programmable microprocessor, microcomputer or multiple processor chip or chips that can be configured by software instructions (applications) to perform a variety of functions, including the functions of the various aspects described herein. In some mobile devices, multiple processors 1301, 1801 may be provided, such as one processor dedicated to wireless communication functions and one processor dedicated to running other applications. Typically, software applications may be stored in the internal memory 1302, 1802 before they are accessed and loaded into the processor 1301, 1801. In some mobile devices, the processor 1301 may include internal memory sufficient to store the application software instructions. As part of the processor, such a secure memory may not be replaced or accessed without damaging or replacing the processor. In some mobile devices, additional memory chips (e.g., a Secure Data (SD) card) may be plugged into the device 1300, 1800 and coupled to the processor 1301, 1801. In many mobile devices, the internal memory 1302, 1802 may be a volatile or nonvolatile memory, such as flash memory, or a mixture of both. For the purposes of this description, a general reference to memory refers to all memory accessible by the processor 1301, 1801, including internal memory 1302, 1802, removable memory plugged into the mobile device, and memory within the processor 1301, 1801 itself, including the secure memory.

The foregoing method descriptions and the process flow diagrams are provided merely as illustrative examples and are not intended to require or imply that the processes of the various aspects must be performed in the order presented. As will be appreciated by one of skill in the art the order of blocks and processes in the foregoing aspects may be performed in any order. Words such as "thereafter," "then," "next," etc. are not intended to limit the order of the processes; these words are simply used to guide the reader through the description of the methods. Further, any reference to claim elements in the singular, for example, using the articles "a," "an" or "the" is not to be construed as limiting the element to the singular.

The various illustrative logical blocks, modules, circuits, and algorithm processes described in connection with the aspects disclosed herein may be implemented as electronic hardware, computer software, or combinations of both. To clearly illustrate this interchangeability of hardware and software, various illustrative components, blocks, modules, circuits, and algorithms have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The hardware used to implement the various illustrative logics, logical blocks, modules, and circuits described in connection with the aspects disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Alternatively, some processes or methods may be performed by circuitry that is specific to a given function.

In one or more exemplary aspects, the functions described may be implemented in hardware, software, firmware, or any combination thereof. If implemented in software, the functions may be stored on or transmitted over as one or more instructions or code on a computer-readable medium. The processes of a method or algorithm disclosed herein may be embodied in a processor-executable software module executed which may reside on a computer-readable medium. Computer-readable media includes both computer storage media and communication media including any medium that facilitates transfer of a computer program from one place to another. A storage media may be any available media that may be accessed by a computer. By way of example, and not limitation, such computer-readable media may comprise RAM, ROM, EEPROM, CD-ROM or other optical disk storage, magnetic disk storage or other magnetic storage devices, or any other medium that may be used to carry or store desired program code in the form of instructions or data structures and that may be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk, and blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and/or instructions stored on a machine readable medium and/or computer-readable medium, which may be incorporated into a computer program product.

The foregoing description of the various aspects is provided to enable any person skilled in the art to make or use the present invention. Various modifications to these aspects will be readily apparent to those skilled in the art, and the generic principles defined herein may be applied to other aspects without departing from the scope of the invention. Thus, the present invention is not intended to be limited to the aspects shown herein, and instead the claims should be accorded the widest scope consistent with the principles and novel features disclosed herein.

What is claimed is:

1. A method for capturing user input on a computing device, comprising:
   receiving an electrical signal from a force sensitive sensor positioned on a case of the computing device;
   comparing the received electrical signal to each of a plurality of reference signal templates;
   calculating cross-correlation values of the received electrical signal and each of the plurality of reference signal templates;
   determining a best match reference signal template for the received electrical signal based on the cross-correlation values;
   identifying a functionality associated with the best match reference signal template; and
   implementing the identified functionality on the computing device.

2. The method of claim 1, wherein implementing the identified functionality on the computing device comprises:
   generating a user input event notification; and
   forwarding the user input event notification to an application executing on the computing device.

3. The method of claim 1, wherein the force sensitive sensor comprises a piezoelectric sensor.

4. The method of claim 1, further comprising:
   filtering the received electrical signal for electromagnetic interference;
   converting the received electrical signal from analog to digital format;
   normalizing the received electrical signal in at least one of frequency and amplitude; and
   identifying a portion of the received electrical signal to compare with the reference signal template.

5. The method of claim 1, further comprising converting the received electrical signal from the force sensitive sensor into frequency domain data,
   wherein comparing the received electrical signal with a reference signal template comprises comparing the sensor signal frequency domain data to a reference frequency domain template.

6. The method of claim 1, wherein calculating cross-correlation values of the received electrical signal and each of the plurality of reference signal templates comprises:
   calculating cross-correlation values of a portion of the received electrical signal and each of a plurality of reference signal templates.

7. The method of claim 1, wherein comparing the received electrical signal with a reference signal template, and determining whether the received electrical signal matches the reference signal template comprises:
   converting at least a portion of the received electrical signal into a frequency domain signal portion;
   calculating cross-correlation values of the frequency domain portion and each of a plurality of reference templates;
   determining a best correlation value; and
   determining whether the correlation value is above a threshold value.

8. The method of claim 1, wherein comparing the received electrical signal with a reference signal template, and determining whether the received electrical signal matches the reference signal template comprises:
   performing a hidden Markov model test on the received electrical signal from the force sensitive sensor.

9. The method of claim 1, wherein comparing the received electrical signal with a reference signal template, and determining whether the received electrical signal matches the reference signal template comprises:
   calculating one or more signal vectors characterizing the received electrical signal from the force sensitive sensor;
   accessing a reference vector characterizing a reference signal;
   calculating a cosine value based on the received signal vector and accessed reference vector; and
   determining whether the calculated cosine value is less than a threshold value.

10. The method of claim 1, further comprising receiving a sensor input from another sensor, wherein identifying a functionality associated with the best match reference signal template comprises identifying a functionality associated both with the best match reference signal template and the sensor input received from the other sensor.

11. The method of claim 1, further comprising detecting a change in temperature based on the received electrical signal from the force sensitive sensor.

12. The method of claim 1, further comprising:
    receiving a user identified functionality to be associated with a user input gesture;
    prompting the user to perform the user input gesture;
    receiving electrical signals from the force sensitive sensor;
    processing the received electrical signals from the force sensitive sensor in order to generate a user-generated reference signal template; and
    storing the user-generated reference signal template in memory in conjunction with the received user identified functionality.

13. The method of claim 1, wherein the computing device is a mobile device.

14. The method of claim 1, wherein the computing device is a tablet computing device.

15. The method of claim 1, further comprising determining when a signal from a force sensor ceases, wherein implementing the identified functionality on the computing device is initiated when the signal from the force sensor ceases.

16. The method of claim 1, further comprising determining when a low battery power condition exists, wherein implementing the identified functionality on the computing device comprises initiating a telephone call in a minimum power state.

17. The method of claim 1, further comprising applying a condition-specific weighting factor to the cross-correlation values.

18. A computing device, comprising:
    a case;
    a processor positioned within the case;
    a memory coupled to the processor, the memory storing a reference signal template; and
    a force sensitive sensor positioned on the case and coupled to the processor,
    wherein the processor is configured with processor-executable instructions to perform operations comprising:
       receiving an electrical signal from the force sensitive sensor;
       comparing the received electrical signal to each of a plurality of reference signal templates;
       calculating cross-correlation values of the received electrical signal and each of the plurality of reference signal templates;
       determining a best match reference signal template for the received electrical signal based on the cross-correlation values;

identifying a functionality associated with the best match reference signal template; and implementing the identified functionality on the computing device.

19. The computing device of claim 18, wherein the processor is configured with processor-executable instructions such that implementing the identified functionality on the computing device comprises:

generating a user input event notification; and forwarding the user input event notification to an application executing on the processor.

20. The computing device of claim 18, wherein the force sensitive sensor comprises a piezoelectric sensor.

21. The computing device of claim 18, wherein the processor is configured with processor-executable instructions to perform operations further comprising:

filtering the received electrical signal for electromagnetic interference;

converting the received electrical signal from analog to digital format;

normalizing the received electrical signal in at least one of frequency and amplitude; and identifying a portion of the received electrical signal to compare with the reference signal template.

22. The computing device of claim 18, wherein the processor is configured with processor-executable instructions to perform operations further comprising converting the received electrical signal from the force sensitive sensor into frequency domain data, wherein the reference signal template is a frequency domain template, and wherein the processor is configured with processor-executable instructions such that comparing the received electrical signal with the reference signal template comprises comparing the sensor signal frequency domain data to the reference frequency domain template.

23. The computing device of claim 18, wherein the processor is configured with processor-executable instructions such that calculating cross-correlation values of the received electrical signal and each of the plurality of reference signal templates comprises:

calculating cross-correlation values of a portion of the received electrical signal and each of the plurality of reference signal templates.

24. The computing device of claim 18, wherein the processor is configured with processor-executable instructions such that comparing the received electrical signal with a reference signal template, and determining whether the received electrical signal matches the reference signal template comprises:

converting at least a portion of the received electrical signal into a frequency domain signal portion;

calculating cross-correlation values of the frequency domain portion and each of a plurality of reference templates;

determining a best correlation value; and determining whether the correlation value is above a threshold value.

25. The computing device of claim 18, wherein the processor is configured with processor-executable instructions such that comparing the received electrical signal with the reference signal template, and determining whether the received electrical signal matches the reference signal template comprises:

performing a hidden Markov model test on the received electrical signal from the force sensitive sensor.

26. The computing device of claim 18, wherein the reference signal template stored in the memory comprises frequency domain template, and wherein the processor is configured with processor-executable instructions such that comparing the received electrical signal with the reference signal template, and determining whether the received electrical signal matches the reference signal template comprises:

calculating one or more signal vectors characterizing the received electrical signal from the force sensitive sensor;

accessing the reference vector stored in the memory;

calculating a cosine value based on the received signal vector and the accessed reference vector; and determining whether the calculated cosine value is less than a threshold value.

27. The computing device of claim 18, further comprising another sensor coupled to the processor, wherein the processor is configured with processor-executable instructions to perform operations further comprising receiving a sensor input from the other sensor, wherein identifying a functionality associated with the best match reference signal template comprises identifying a functionality associated both with the best match reference signal template and the sensor input received from the other sensor.

28. The computing device of claim 18, wherein the processor is configured with processor-executable instructions to perform operations further comprising detecting a change in temperature based on the received electrical signal from the force sensitive sensor.

29. The computing device of claim 18, wherein the processor is configured with processor-executable instructions to perform operations further comprising:

receiving a user identified functionality to be associated with a user input gesture;

prompting the user to perform the user input gesture;

receiving electrical signals from the force sensitive sensor;

processing the received electrical signals from the force sensitive sensor in order to generate a user-generated reference signal template; and storing the user-generated reference signal template in the memory in conjunction with the received user identified functionality.

30. The computing device of claim 18, wherein the computing device is a mobile device.

31. The computing device of claim 18, wherein the computing device is a tablet computing device.

32. The computing device of claim 18, wherein the processor is configured with processor-executable instructions to perform operations further comprising determining when a signal from a force sensor ceases, wherein implementing the identified functionality on the computing device is initiated when the signal from the force sensor ceases.

33. The computing device of claim 18, wherein the processor is configured with processor-executable instructions to perform operations further comprising determining when a low battery power condition exists, wherein implementing the identified functionality on the computing device comprises initiating a telephone call in a minimum power state.

34. The computing device of claim 18, wherein the force sensitive sensor is positioned on an external surface of the case.

35. The computing device of claim 18, wherein the force sensitive sensor is positioned on an internal surface of the case.

36. The computing device of claim 18, comprising a plurality of force sensitive sensors positioned on the case and coupled to the processor.

37. The computing device of claim 36, wherein at least a portion of the plurality of force sensitive sensors are positioned on a back surface of the case.

38. The computing device of claim 36, wherein at least a portion of the plurality of force sensitive sensors are positioned on each side of the case.

39. The computing device of claim 36, wherein a portion of the plurality of force sensitive sensors are positioned on each side of the case and a portion of the plurality of force sensitive sensors are positioned on each side of the case.

40. The computing device of claim 18, wherein the processor is configured with processor-executable instructions to perform operations further comprising applying a condition-specific weighting factor to the correlation values.

41. A computing device, comprising:
force sensing means for sensing a force applied to a case of the computing device;
means for receiving an electrical signal from the force sensing means;
means for comparing the received electrical signal to each of a plurality of reference signal templates;
means for calculating cross-correlation values of the received electrical signal and each of the plurality of reference signal templates;
means for determining a best match reference signal template for the received electrical signal based on the cross-correlation values;
means for identifying a functionality associated with the best match reference signal template; and
means for implementing the identified functionality on the computing device.

42. The computing device of claim 41, wherein means for implementing the identified functionality on the computing device comprises:
means for generating a user input event notification; and
means for forwarding the user input event notification to an application executing on the computing device.

43. The computing device of claim 41, wherein the force sensing means comprises a piezoelectric sensor.

44. The computing device of claim 41, further comprising:
means for filtering the received electrical signal for electromagnetic interference;
means for converting the received electrical signal from analog to digital format;
means for normalizing the received electrical signal in at least one of frequency and amplitude; and
means for identifying a portion of the received electrical signal to compare with the reference signal template.

45. The computing device of claim 41, further comprising means for converting the received electrical signal from the force sensing means into frequency domain data,
wherein means for comparing the received electrical signal with a reference signal template comprises means for comparing the sensor signal frequency domain data to a reference frequency domain template.

46. The computing device of claim 41, wherein means for calculating cross-correlation values of the received electrical signal and each of the plurality of reference signal templates comprises:
means for calculating cross-correlation values of a portion of the received electrical signal and each of a plurality of reference signal templates.

47. The computing device of claim 41, wherein means for comparing the received electrical signal with a reference signal template, and means for determining whether the received electrical signal matches the reference signal template comprises:
means for converting at least a portion of the received electrical signal into a frequency domain signal portion;
means for calculating cross-correlation values of the frequency domain portion and each of a plurality of reference templates;
means for determining a best correlation value; and
means for determining whether the correlation value is above a threshold value.

48. The computing device of claim 41, wherein means for comparing the received electrical signal with a reference signal template, and means for determining whether the received electrical signal matches the reference signal template comprises:
means for performing a hidden Markov model test on the received electrical signal from the force sensing means.

49. The computing device of claim 41, wherein means for comparing the received electrical signal with a reference signal template, and means for determining whether the received electrical signal matches the reference signal template comprises:
means for calculating one or more signal vectors characterizing the received electrical signal from the force sensing means;
means for accessing a reference vector characterizing a reference signal;
means for calculating a cosine value based on the received signal vector and accessed reference vector; and
means for determining whether the calculated cosine value is less than a threshold value.

50. The computing device of claim 41, further comprising means for receiving a sensor input from another sensor, wherein means for identifying a functionality associated with the best match reference signal template comprises means for identifying a functionality associated both with the best match reference signal template and the sensor input received from the other sensor.

51. The computing device of claim 41, further comprising means for detecting a change in temperature based on the received electrical signal from the force sensing means.

52. The computing device of claim 41, further comprising:
means for receiving a user identified functionality to be associated with a user input gesture;
means for prompting the user to perform the user input gesture;
means for receiving electrical signals from the force sensing means;
means for processing the received electrical signals from the force sensing means in order to generate a user-generated reference signal template; and
means for storing the user-generated reference signal template in memory in conjunction with the received user identified functionality.

53. The computing device of claim 41, wherein the computing device is a mobile device.

54. The computing device of claim 41, wherein the computing device is a tablet computing device.

55. The computing device of claim 41, further comprising means for determining when a signal from a force sensor ceases, wherein means for implementing the identified functionality on the computing device comprises means for initiated the identified functionality when the signal from the force sensor ceases.

56. The computing device of claim 41, further comprising means for determining when a low battery power condition exists, wherein means for implementing the identified functionality on the computing device comprises means for initiating a telephone call in a minimum power state.

57. The computing device of claim 41, wherein the force sensing means is positioned on an external surface of the case.

58. The computing device of claim 41, wherein the force sensing means is positioned on an internal surface of the case.

59. The computing device of claim 41, wherein the force sensing means comprises a plurality of force sensitive sensors.

60. The computing device of claim 59, wherein at least a portion of the plurality of force sensitive sensors are positioned on a back surface of the case.

61. The computing device of claim 59, wherein at least a portion of the plurality of force sensitive sensors are positioned on each side of the case.

62. The computing device of claim 59, wherein a portion of the plurality of force sensitive sensors are positioned on each side of the case and a portion of the plurality of force sensitive sensors are positioned on each side of the case.

63. The computing device of claim 41, further comprising means for applying a condition-specific weighting factor to the correlation values.

64. A non-transitory processor-readable storage medium having stored thereon processor-executable instructions configured to cause a processor to perform operations comprising:
- receiving an electrical signal from a force sensitive sensor;
- comparing the received electrical signal to each of a plurality of reference signal templates;
- calculating cross-correlation values of the received electrical signal and each of the plurality of reference signal templates;
- determining a best match reference signal template for the received electrical signal based on the cross-correlation values;
- identifying a functionality associated with the best match reference signal template; and
- implementing the identified functionality.

65. The non-transitory processor-readable storage medium of claim 64, wherein the stored processor-executable instructions are configured such that implementing the identified functionality on the computing device comprises:
- generating a user input event notification; and
- forwarding the user input event notification to an application executing on the processor.

66. The non-transitory processor-readable storage medium of claim 64, wherein the stored processor-executable instructions are configured to receive electrical signals from a piezoelectric sensor.

67. The non-transitory processor-readable storage medium of claim 64, wherein the stored processor-executable instructions are to configured cause a processor to perform operations further comprising:
- filtering the received electrical signal for electromagnetic interference;
- converting the received electrical signal from analog to digital format;
- normalizing the received electrical signal in at least one of frequency and amplitude; and
- identifying a portion of the received electrical signal to compare with the reference signal template.

68. The non-transitory processor-readable storage medium of claim 64, wherein the stored processor-executable instructions are configured to cause a processor to perform operations further comprising converting the received electrical signal from the force sensitive sensor into frequency domain data,
- wherein the reference signal template is a frequency domain template, and
- wherein the processor is configured with processor-executable instructions such that comparing the received electrical signal with the reference signal template comprises comparing the sensor signal frequency domain data to the reference frequency domain template.

69. The non-transitory processor-readable storage medium of claim 64, wherein the stored processor-executable instructions are configured such that calculating cross-correlation values of the received electrical signal and each of the plurality of reference signal templates comprises:
- calculating cross-correlation values of a portion of the received electrical signal and each of a plurality of reference signal template.

70. The non-transitory processor-readable storage medium of claim 64, wherein the stored processor-executable instructions are configured such that comparing the received electrical signal with a reference signal template, and determining whether the received electrical signal matches the reference signal template comprises:
- converting at least a portion of the received electrical signal into a frequency domain signal portion;
- calculating cross-correlation values of the frequency domain portion and each of a plurality of reference templates;
- determining a best correlation value; and
- determining whether the correlation value is above a threshold value.

71. The non-transitory processor-readable storage medium of claim 64, wherein the stored processor-executable instructions are configured such that comparing the received electrical signal with the reference signal template, and determining whether the received electrical signal matches the reference signal template comprises:
- performing a hidden Markov model test on the received electrical signal from the force sensitive sensor.

72. The non-transitory processor-readable storage medium of claim 64, wherein the stored processor-executable instructions are configured such that comparing the received electrical signal with the reference signal template, and determining whether the received electrical signal matches the reference signal template comprises:
- calculating one or more signal vectors characterizing the received electrical signal from the force sensitive sensor;
- accessing a reference vector characterizing the reference signal;
- calculating a cosine value based on the received signal vector and the accessed reference vector; and
- determining whether the calculated cosine value is less than a threshold value.

73. The non-transitory processor-readable storage medium of claim 64, wherein the stored processor-executable instructions are configured to cause a processor to perform operations further comprising receiving a sensor input from another sensor, wherein the stored processor-executable instructions are configured such that identifying a functionality associated with the best match reference signal template comprises identifying a functionality associated both with the best match reference signal template and the sensor input received from the other sensor.

74. The non-transitory processor-readable storage medium of claim 64, wherein the stored processor-executable instructions are configured to cause a processor to perform operations further comprising detecting a change in temperature based on the received electrical signal from the force sensitive sensor.

75. The non-transitory processor-readable storage medium of claim 64, wherein the stored processor-executable instructions are configured to cause a processor to perform operations further comprising:

receiving a user identified functionality to be associated with a user input gesture;

prompting the user to perform the user input gesture;

receiving electrical signals from the force sensitive sensor;

processing the received electrical signals from the force sensitive sensor in order to generate a user-generated reference signal template; and storing the user-generated reference signal template in the memory in conjunction with the received user identified functionality.

76. The non-transitory processor-readable storage medium of claim 64, wherein the stored processor-executable instructions are configured to be performed by a processor of a mobile device.

77. The non-transitory processor-readable storage medium of claim 64, wherein the stored processor-executable instructions are configured to be performed by a processor of a tablet computing device.

78. The non-transitory processor-readable storage medium of claim 64, wherein the stored processor-executable instructions are configured to cause a processor to perform operations further comprising determining when a signal from a force sensor ceases, wherein implementing the identified functionality on the computing device is initiated when the signal from the force sensor ceases.

79. The non-transitory processor-readable storage medium of claim 64, wherein the stored processor-executable instructions are configured to cause a processor to perform operations further comprising determining when a low battery power condition exists, wherein implementing the identified functionality on the computing device comprises initiating a telephone call in a minimum power state.

80. The non-transitory processor-readable storage medium of claim 64, wherein the stored processor-executable instructions are to configured cause a processor to perform operations further comprising applying a condition-specific weighting factor to the correlation values.

* * * * *